(12) United States Patent
Osada et al.

(10) Patent No.: US 9,461,300 B2
(45) Date of Patent: Oct. 4, 2016

(54) POWER STORAGE DEVICE

(71) Applicant: SEMICONDUCTOR ENERGY LABORATORY CO., LTD., Atsugi-shi, Kanagawa-ken (JP)

(72) Inventors: Takeshi Osada, Kanagawa (JP); Ryota Tajima, Kanagawa (JP); Teppei Oguni, Kanagawa (JP); Shunpei Yamazaki, Tokyo (JP)

(73) Assignee: SEMICONDUCTOR ENERGY LABORATORY CO., LTD., Kanagawa-ken (JP)

(*) Notice: Subject to any disclaimer, the term of this patent is extended or adjusted under 35 U.S.C. 154(b) by 482 days.

(21) Appl. No.: 13/626,054

(22) Filed: Sep. 25, 2012

(65) Prior Publication Data

US 2013/0084496 A1  Apr. 4, 2013

(30) Foreign Application Priority Data

Sep. 30, 2011  (JP) ................. 2011-217911

(51) Int. Cl.
*H01M 4/134* (2010.01)
*H01M 4/36* (2006.01)
*H01M 4/587* (2010.01)
*H01M 4/62* (2006.01)
*H01M 10/0525* (2010.01)
*H01M 2/16* (2006.01)
(Continued)

(52) U.S. Cl.
CPC ............ *H01M 4/134* (2013.01); *H01M 4/366* (2013.01); *H01M 4/587* (2013.01); *H01M 4/625* (2013.01); *H01M 2/1673* (2013.01); *H01M 2/18* (2013.01); *H01M 10/0525* (2013.01); *H01M 2004/025* (2013.01); *H01M 2004/027* (2013.01); *Y02E 60/122* (2013.01)

(58) Field of Classification Search
None
See application file for complete search history.

(56) References Cited

U.S. PATENT DOCUMENTS 5,567,544 A * 10/1996 Lyman .................. 429/152
7,179,561 B2  2/2007 Niu et al.
7,745,047 B2  6/2010 Zhamu et al.
(Continued)

FOREIGN PATENT DOCUMENTS

CN  101107746 A  1/2008
CN  103022409 A  4/2013
(Continued)

OTHER PUBLICATIONS

Chan.C et al., "High-performance lithium battery anodes using silicon nanowires,", *Nature Nanotechnology*, Dec. 16, 2007, vol. 3, pp. 31-35.
(Continued)

*Primary Examiner* — Miriam Stagg
*Assistant Examiner* — Carmen Lyles-Irving
(74) *Attorney, Agent, or Firm* — Nixon Peabody LLP; Jeffrey L. Costellia

(57) ABSTRACT

Provided are an electrode for a power storage device having much better charge/discharge characteristics and a power storage device using the electrode. A plurality of cavities is provided in a surface of an active material layer over a current collector. A graphene covering the active material layer facilitates rapid charge/discharge and prevents breakdown of the current collector caused by charge/discharge. With improved charge/discharge characteristics, an electrode for a power storage device which does not easily deteriorate and a power storage device using the electrode can be provided.

10 Claims, 13 Drawing Sheets

(51) Int. Cl.
  *H01M 2/18* (2006.01)
  *H01M 4/02* (2006.01)

(56) References Cited

U.S. PATENT DOCUMENTS

| | | | |
|---|---|---|---|
| 7,842,432 | B2 | 11/2010 | Niu et al. |
| 7,939,218 | B2 | 5/2011 | Niu |
| 7,977,007 | B2 | 7/2011 | Niu et al. |
| 7,977,013 | B2 | 7/2011 | Niu et al. |
| 8,076,027 | B2 | 12/2011 | Honda et al. |
| 8,257,866 | B2 | 9/2012 | Loveness et al. |
| 8,278,011 | B2 | 10/2012 | Zhu et al. |
| 8,450,012 | B2 | 5/2013 | Cui et al. |
| 8,551,657 | B2 | 10/2013 | Yoshida et al. |
| 8,556,996 | B2 | 10/2013 | Loveness et al. |
| 8,795,885 | B2 * | 8/2014 | Prieto et al. ............... 429/209 |
| 8,822,088 | B2 | 9/2014 | Tajima et al. |
| 9,045,346 | B2 | 6/2015 | Nesper et al. |
| 2003/0049537 | A1 * | 3/2003 | Wadley et al. ............. 429/238 |
| 2007/0131915 | A1 | 6/2007 | Stankovich et al. |
| 2008/0153000 | A1 * | 6/2008 | Salot ............... H01M 4/13 429/218.1 |
| 2008/0254296 | A1 | 10/2008 | Handa et al. |
| 2009/0110627 | A1 | 4/2009 | Choi et al. |
| 2009/0117467 | A1 | 5/2009 | Zhamu et al. |
| 2010/0021819 | A1 | 1/2010 | Zhamu et al. |
| 2010/0078591 | A1 | 4/2010 | Sano et al. |
| 2010/0081057 | A1 | 4/2010 | Liu et al. |
| 2010/0143798 | A1 | 6/2010 | Zhamu et al. |
| 2010/0176337 | A1 | 7/2010 | Zhamu et al. |
| 2010/0209784 | A1 | 8/2010 | Yamazaki et al. |
| 2010/0227228 | A1 | 9/2010 | Yamazaki et al. |
| 2010/0248034 | A1 | 9/2010 | Oki et al. |
| 2010/0285358 | A1 | 11/2010 | Cui et al. |
| 2010/0308277 | A1 | 12/2010 | Grupp et al. |
| 2010/0330419 | A1 | 12/2010 | Cui et al. |
| 2010/0330421 | A1 | 12/2010 | Cui et al. |
| 2011/0012067 | A1 | 1/2011 | Kay |
| 2011/0020706 | A1 | 1/2011 | Nesper |
| 2011/0070146 | A1 | 3/2011 | Song et al. |
| 2011/0111299 | A1 | 5/2011 | Liu et al. |
| 2011/0111303 | A1 | 5/2011 | Kung et al. |
| 2011/0121240 | A1 | 5/2011 | Amine et al. |
| 2011/0133131 | A1 | 6/2011 | Zhou et al. |
| 2011/0159372 | A1 | 6/2011 | Zhamu et al. |
| 2011/0183203 | A1 | 7/2011 | Du et al. |
| 2011/0227000 | A1 | 9/2011 | Ruoff et al. |
| 2011/0229761 | A1 | 9/2011 | Cui et al. |
| 2011/0229795 | A1 | 9/2011 | Niu et al. |
| 2011/0266654 | A1 | 11/2011 | Kuriki et al. |
| 2011/0269016 | A1 | 11/2011 | Takeuchi et al. |
| 2011/0278506 | A1 | 11/2011 | Toyokawa |
| 2011/0287318 | A1 | 11/2011 | Loveness et al. |
| 2011/0291240 | A1 | 12/2011 | Yamazaki |
| 2012/0058397 | A1 | 3/2012 | Zhamu et al. |
| 2012/0070741 | A1 | 3/2012 | Liu et al. |
| 2012/0183856 | A1 | 7/2012 | Cui et al. |
| 2012/0225353 | A1 * | 9/2012 | Yoshida et al. ............. 429/211 |
| 2013/0071739 | A1 | 3/2013 | Tajima et al. |
| 2013/0071762 | A1 | 3/2013 | Tajima et al. |
| 2013/0084495 | A1 | 4/2013 | Tajima et al. |
| 2013/0320582 | A1 | 12/2013 | Cui et al. |
| 2013/0344383 | A1 | 12/2013 | Loveness et al. |

FOREIGN PATENT DOCUMENTS

| | | |
|---|---|---|
| EP | 2256087 A | 12/2010 |
| EP | 2 309 573 A1 | 4/2011 |
| JP | 11-233116 A | 8/1999 |
| JP | 2001-283834 | 10/2001 |
| JP | 2004-158240 A | 6/2004 |
| JP | 2005-158721 A | 6/2005 |
| JP | 2006-265751 | 10/2006 |
| JP | 2008-077969 A | 4/2008 |
| JP | 2008-103118 | 5/2008 |
| JP | 2008-159589 A | 7/2008 |
| JP | 2009-524567 | 7/2009 |
| JP | 2009-176721 | 8/2009 |
| JP | 2010-219030 | 9/2010 |
| JP | 2010-219392 | 9/2010 |
| JP | 2010-239122 | 10/2010 |
| JP | 2010-262843 A | 11/2010 |
| JP | 2010-275186 A | 12/2010 |
| JP | 2011-503804 | 1/2011 |
| JP | 2011-029184 | 2/2011 |
| JP | 2011-048992 | 3/2011 |
| JP | 2011-057541 | 3/2011 |
| JP | 2011-103256 A | 5/2011 |
| JP | 2011-517053 | 5/2011 |
| JP | 2012-190625 A | 10/2012 |
| WO | WO-2006/062947 A2 | 6/2006 |
| WO | WO-2007/061945 A2 | 5/2007 |
| WO | WO-2009/061685 A1 | 5/2009 |
| WO | WO-2009/127901 A1 | 10/2009 |
| WO | WO-2009/144600 A2 | 12/2009 |
| WO | WO-2010/129910 | 11/2010 |
| WO | WO-2010/138617 | 12/2010 |
| WO | WO-2010/138619 | 12/2010 |
| WO | WO-2011/058416 | 5/2011 |
| WO | WO-2011/109477 | 9/2011 |
| WO | WO-2011/119614 | 9/2011 |
| WO | WO-2011/149958 | 12/2011 |
| WO | WO-2012/054767 | 4/2012 |

OTHER PUBLICATIONS

Zhou.X et al., "Graphene modified LiFePO4 cathode materials for high power lithium ion batteries,", J. Mater. Chem. (Journal of Materials Chemistry), 2011, vol. 21, pp. 3353-3358.

Su.F et al., "Flexible and planar graphene conductive additives for lithium-ion batteries,", J. Mater. Chem. (Journal of Materials Chemistry), 2010, vol. 20, pp. 9644-9650.

Yu.G et al., "Solution-Processed Graphene/MnO2 Nanostructured Textiles for High-Performance Electrochemical Capacitors,", Nano Letters, 2011, vol. 11, No. 7, pp. 2905-2911.

Chinese Office Action (Application No. 201210368578.3), dated Nov. 4, 2015.

* cited by examiner

POWER STORAGE DEVICE

BACKGROUND OF THE INVENTION

1. Field of the Invention

The present invention relates to a negative electrode for a power storage device and a method of manufacturing a power storage device using the negative electrode.

2. Description of the Related Art

In recent years, power storage devices such as lithium secondary batteries, lithium-ion capacitors, and air cells have been developed.

A power storage device has two electrodes: a positive electrode and a negative electrode. To provide a negative electrode for a power storage device, an active material is formed over a surface of a current collector. As a negative electrode active material, a material that can occlude and release ions functioning as carriers (hereinafter referred to as carrier ions), such as carbon or silicon, is used. Silicon or phosphorus-doped silicon, for example, is beneficial to the higher capacity of a power storage device because they can occlude about four times as many carrier ions as carbon and accordingly have higher theoretical capacity than carbon.

However, as the number of carrier ions to be occluded increases, occlusion and release of carrier ions in charge/discharge cycles changes the volume of an active material significantly to impair adhesion between a current collector and silicon; thus, charge/discharge degrades battery characteristics. In view of this, the following way has been proposed: a layer containing silicon is formed over a current collector and a layer containing a graphite is formed over the layer containing silicon so that expansion and contraction of the layer containing silicon influences less on degradation of battery characteristics (see Patent Document 1).

Further, since silicon has lower electric conductivity than carbon, surfaces of silicon particles are covered with a graphite and the active material layer including the silicon particles is formed over a current collector, whereby a negative electrode having an active material layer the resistivity of which is reduced is manufactured.

In recent years, the use of a graphene as an electronic material having electric conductivity in semiconductor devices has been considered. The term graphene refers to a sheet of carbon molecules with a thickness of one atomic layer having $sp^2$ bonds.

Since a graphene is chemically stable and has favorable electric characteristics, it has been expected to be applied to semiconductor devices, for example, channel regions of transistors, vias, and wirings. In addition, the following way has been proposed: active material particles are covered with a graphite or a graphene in order to increase the electric conductivity of an electrode material for a lithium-ion battery (see Patent Document 2).

Further, the following way has been proposed: in a power storage device including a positive electrode and a negative electrode which are each provided with a plurality of protrusions for higher capacity, an insulator is formed at a top portion of each of the protrusions of the positive and negative electrodes in order to reduce a pressure which is applied to a separator between the electrodes when the electrodes increase in volume due to charge/discharge (see Patent Documents 3 to 5).

REFERENCES

Patent Documents

[Patent Document 1] Japanese Published Patent Application No. 2001-283834

[Patent Document 2] Japanese Published Patent Application No. 2011-029184

[Patent Document 3] Japanese Published Patent Application No. 2010-219030

[Patent Document 4] Japanese Published Patent Application No. 2010-239122

[Patent Document 5] Japanese Published Patent Application No. 2010-219392

SUMMARY OF THE INVENTION

To cover a layer containing silicon, which is provided over a current collector, a layer containing a graphite needs to be thick, e.g., submicrometers or micrometers thick, which decreases the number of carrier ions that transfer between an electrolyte and the layer containing silicon. Further, an active material layer including silicon particles which is covered with a graphite contains less silicon. These problems reduce reaction between silicon and carrier ions, resulting in lower charge/discharge capacity and slower charge/discharge of a power storage device.

In addition, even in the case where active material particles are covered with a graphene, it is difficult to suppress expansion of the volume of the particles of the active material due to repeated charge/discharge and the resulting pulverization of the particles of the active material.

In view of the above, one embodiment of the present invention provides a negative electrode for a power storage device, which has high charge/discharge capacity, is capable of rapid charge/discharge, and unlikely to degrade battery characteristics due to charge/discharge, i.e., a power storage device whose so-called charge/discharge characteristics are improved, and provides a power storage device using the negative electrode.

One embodiment of the present invention is a negative electrode for a power storage device, which includes a current collector and an active material layer. The active material layer is provided over the current collector and has a surface having a plurality of cavities.

One embodiment of the present invention is a negative electrode for a power storage device, which includes a current collector and an active material layer. The active material layer includes a common portion, a projecting portion, and a plurality of cavities. The common portion is provided over the current collector. The projecting portion projects from the common portion.

One embodiment of the present invention is a method of manufacturing a negative electrode in which after a mask is formed over an active material layer, at least a projecting portion and a plurality of cavities are formed by etching of part of the active material layer, and a graphene is formed over the active material layer.

One embodiment of the present invention is a method of manufacturing a negative electrode in which after a mask is formed over a silicon substrate, a common portion, a projecting portion, and a plurality of cavities is formed by etching of part of the silicon substrate, and a graphene is formed over the common portion and the projecting portion.

One embodiment of the present invention is a power storage device using any of the above negative electrodes.

The negative electrode of one embodiment of the present invention has a shape in which a cavity is surrounded by the projecting portion when seen from the active material layer side of the negative electrode. In other words, the negative electrode of one embodiment of the present invention has a shape in which a cavity is surrounded by the active material layer when the negative electrode is seen from above.

The plurality of cavities in the active material layer can reduce an internal stress, which is due to a change in the volume of the projecting portion of the active material layer during charge/discharge, so that separation or breakdown (pulverization) of the projecting portion can be prevented. Further, when the projecting portion is seen from above, the area of a cavity per unit area including the cavity is greater than or equal to 10%, preferably greater than or equal to 20%, in which case the separation or breakdown can be more effectively prevented. In addition, cavities which differ in shape or size in the active material layer may be present in combination.

The active material layer may be formed using silicon, silicon to which an impurity imparting a conductivity type such as phosphorus or boron is added, single crystal silicon, polycrystalline silicon, or amorphous silicon. Alternatively, the active material layer may be formed using single crystal silicon or polycrystalline silicon for the common portion and using amorphous silicon for the projecting portion. Further alternatively, the active material layer may be formed using single crystal silicon or polycrystalline silicon for the common portion and part of the projecting portion, and using amorphous silicon for the other part of the projecting portion.

Further, the graphene covering the active material layer can more effectively prevent a degradation phenomenon such as separation or breakdown of the active material due to charge/discharge. The graphene covering the active material layer can also reduce an increase in solid electrolyte interface (SEI), which is a cause of degradation of charge/discharge cycle characteristics. In addition, since the graphene has high electric conductivity, the conductivity of carrier ions can be increased, so that reactivity between an active material and carrier ions can be increased.

The electric conductivity of silicon is lower than that of carbon, and is further reduced when silicon becomes amorphous due to charge/discharge. Thus, a negative electrode using silicon as an active material has high resistivity. However, since a graphene has high electric conductivity, a graphene covering silicon enables electrons to transfer at sufficiently high speed in the graphene through which carrier ions pass. In addition, since a graphene has a thin sheet-like shape, a graphene covering the projecting portion increases the silicon content in the active material layer and makes transfer of carrier ions easier than a graphite. Accordingly, the conductivity of carrier ions can be increased, reactivity between silicon used as the active material and carrier ions can be increased, and carrier ions can be easily occluded by silicon.

Thus, by using the negative electrode including the active material layer covered with the graphene, a power storage device which can perform charge/discharge at high speed and is unlikely to be degraded by charge/discharge (has much better charge/discharge cycle characteristics) can be provided.

In accordance with one embodiment of the present invention, a power storage device having high charge/discharge capacity which is capable of rapid charge/discharge and unlikely to be degraded by charge/discharge can be provided.

DETAILED DESCRIPTION OF THE INVENTION

Figure 1A:
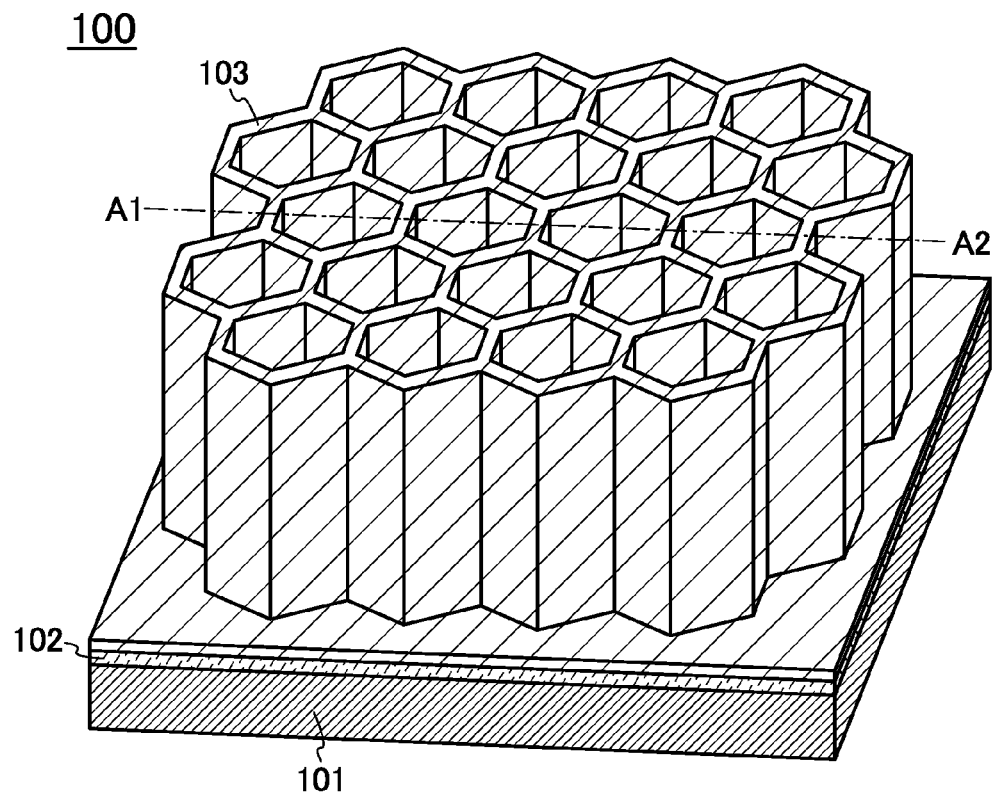
FIGS. 1A and 1B illustrate a negative electrode.

Hereinafter, embodiments will be described with reference to the drawings. However, the embodiments can be implemented in many different modes, and it will be readily appreciated by those skilled in the art that modes and details thereof can be changed in various ways without departing from the spirit and the scope of the present invention. Thus, the present invention should not be interpreted as being limited to the following description of the embodiments. Note that, in the drawings given below, the same portions or portions having similar functions are denoted by the same reference numerals, and repetitive description thereof is omitted.

(Embodiment 1)

In this embodiment, an example of a structure of a negative electrode for a power storage device which is unlikely to be degraded by charge/discharge and has good charge/discharge cycle characteristics and an example of a method of manufacturing the negative electrode are described with reference to FIGS. 1A and 1B, FIGS. 2A and 2B, FIGS. 3A and 3B, FIGS. 4A and 4B, FIGS. 5A to 5C, FIGS. 6A and 6B, FIGS. 7A to 7C, and FIGS. 8A to 8C.

Figure 1B:
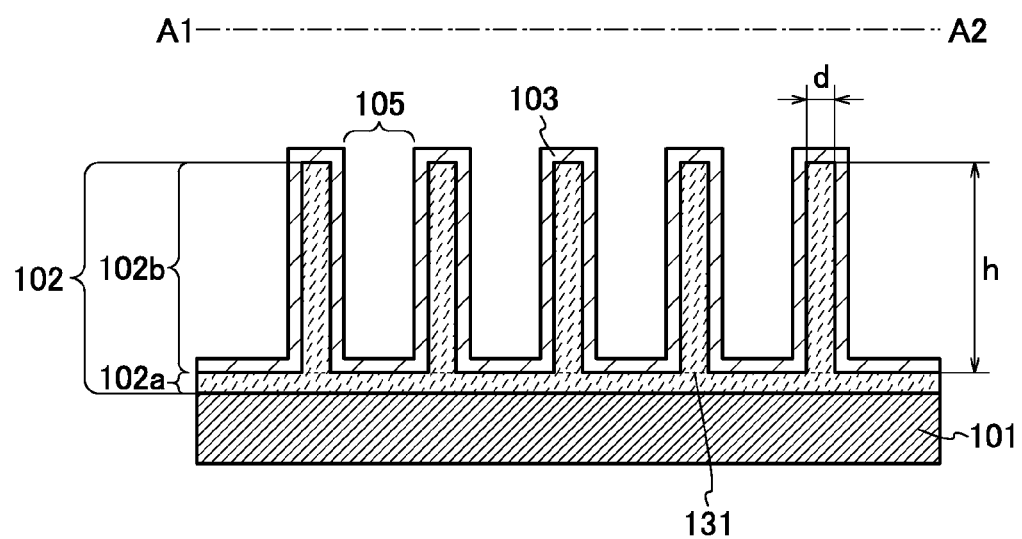

FIG. 1A is a perspective view illustrating part of a negative electrode 100. FIG. 1B is a cross-sectional view of the negative electrode 100 taken along the line A1-A2 in FIG. 1A. The negative electrode 100 includes, over a current collector 101, an active material layer 102 which has a surface having a plurality of cavities. In this embodiment, a graphene 103 covering the active material layer 102 is provided over the negative electrode 100.

Note that the term active material refers to a substance that relates to occlusion and release of carrier ions. An active material layer may include one or more of an electrically conductive additive, a binder, a graphene, and the like in addition to the active material. Thus, the active material and the active material layer are distinguished from each other.

A secondary battery in which lithium ions are used as carrier ions is referred to as a lithium secondary battery. Examples of carrier ions which can be used instead of lithium ions are alkali metal ions such as sodium ions and potassium ions; alkaline-earth metal ions such as calcium ions, strontium ions, and barium ions; beryllium ions; magnesium ions; and the like.

A structure of the negative electrode 100 is described in detail with reference to FIG. 1B. The current collector 101 can be formed using a material having high electric conductivity such as a metal typified by stainless steel, gold, platinum, zinc, iron, aluminum, copper, or titanium, or an alloy thereof. Note that the current collector 101 is preferably formed using an aluminum alloy to which an element which improves heat resistance, such as silicon, titanium, neodymium, scandium, or molybdenum, is added. Alternatively, the current collector 101 may be formed using a metal element which forms silicide by reacting with silicon. Examples of the metal element which forms silicide by reacting with silicon are zirconium, titanium, hathium, vanadium, niobium, tantalum, chromium, molybdenum, tungsten, cobalt, nickel, and the like.

The current collector 101 can have a foil-like shape, a plate-like shape (sheet-like shape), a net-like shape, a punching-metal shape, an expanded-metal shape, or the like as appropriate.

The active material layer 102 includes the common portion 102a, the projecting portion 102b projecting from the common portion 102a, and the cavities 105 which are openings in the surface of the active material layer 102.

As the active material layer 102, any one or more of silicon, germanium, tin, aluminum, and the like, which can occlude and release ions serving as carriers, is used. The active material layer 102 can be formed by a CVD method, a sputtering method, an evaporation method, or the like as appropriate. Note that silicon is preferably used as the active material layer 102 because of its high theoretical charge/discharge capacity. Alternatively, silicon to which an impurity element imparting one conductivity type, such as phosphorus or boron, is added, i.e., n-type silicon or p-type silicon may be used. Silicon to which the impurity element imparting one conductivity type, such as phosphorus or boron, is added has higher electric conductivity and can increase the electric conductivity of the negative electrode accordingly. This enables rapid charge/discharge of the power storage device and improves charge/discharge characteristics.

The common portion 102a serves as a base layer of the projecting portion 102b. The common portion 102a is a continuous layer and is in contact with the projecting portion 102b.

The common portion 102a and the projecting portion 102b can have a single crystal structure or a polycrystalline structure as appropriate. Alternatively, the common portion 102a can have a single crystal structure or a polycrystalline structure while the projecting portion 102b has an amorphous structure. Further alternatively, the common portion 102a and part of the projecting portion 102b can have a single crystal structure or a polycrystalline structure, while the other part of the projecting portion 102b has an amorphous structure. Note that the expression part of the projecting portion 102b includes at least a region in contact with the common portion 102a.

Figure 2A:
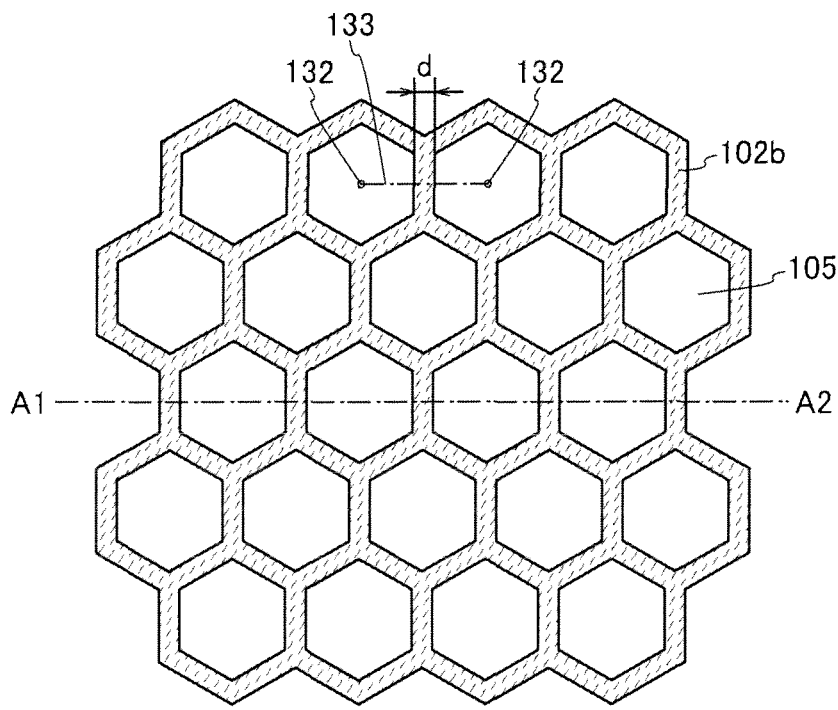
FIGS. 2A and 2B each illustrate a top view of a current collector included in a negative electrode.
Figure 2B:
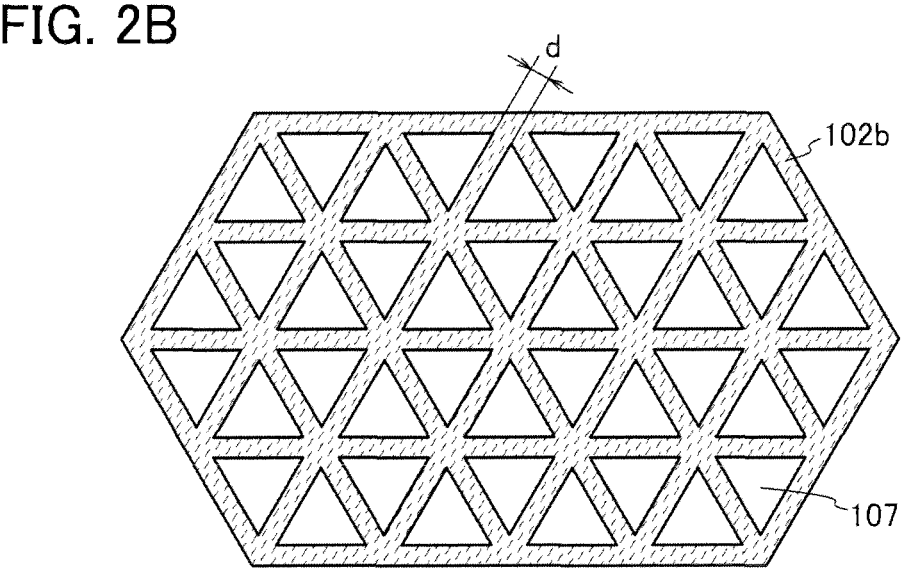

FIG. 2A is a top view of the projecting portion 102b of the active material layer 102. The projecting portion 102b described in this embodiment has a so-called honeycomb structure in which the hexagonal openings 105 are arranged in a matrix when the active material layer 102 is seen from above.

Figure 3A:
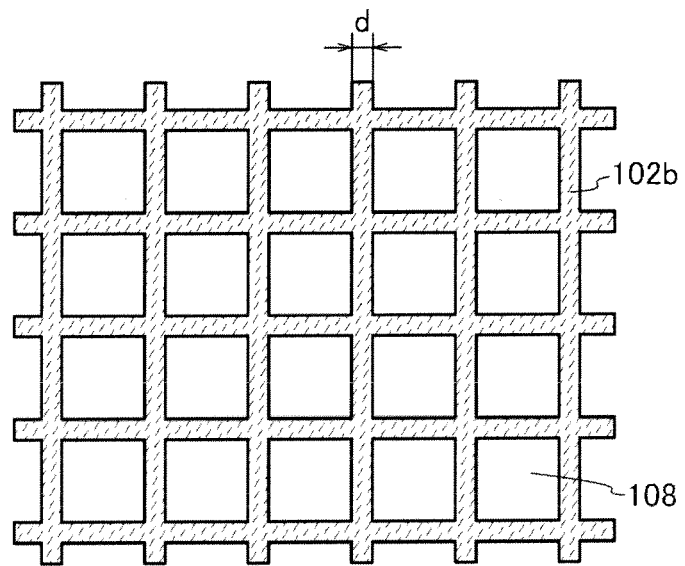
FIGS. 3A and 3B each illustrate a top view of a current collector included in a negative electrode.
Figure 3B:
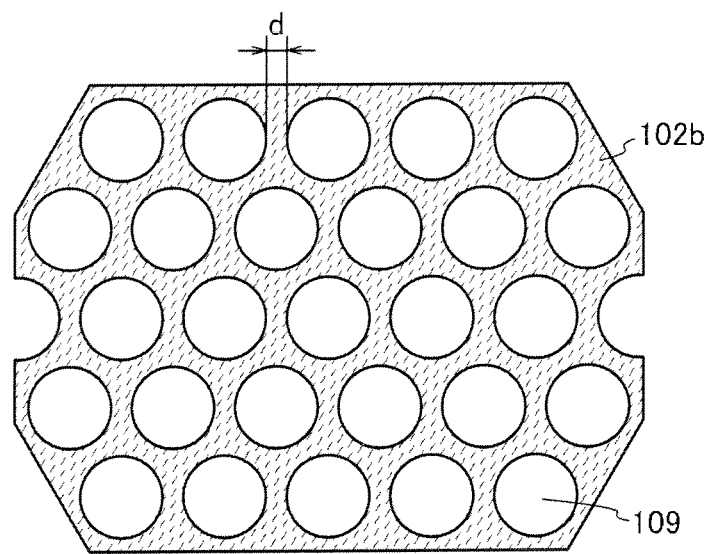

The structure of the projecting portion 102b seen from above is not limited to the honeycomb structure illustrated in FIG. 2A and may be a truss structure in which the triangular cavities 107 are arranged in a matrix (see FIG. 2B), a grid structure in which the rectangular cavities 108 are arranged in a matrix (see FIG. 3A), or a structure in which the circular cavities 109 are arranged in a matrix (see FIG. 3B).

Figure 4A:
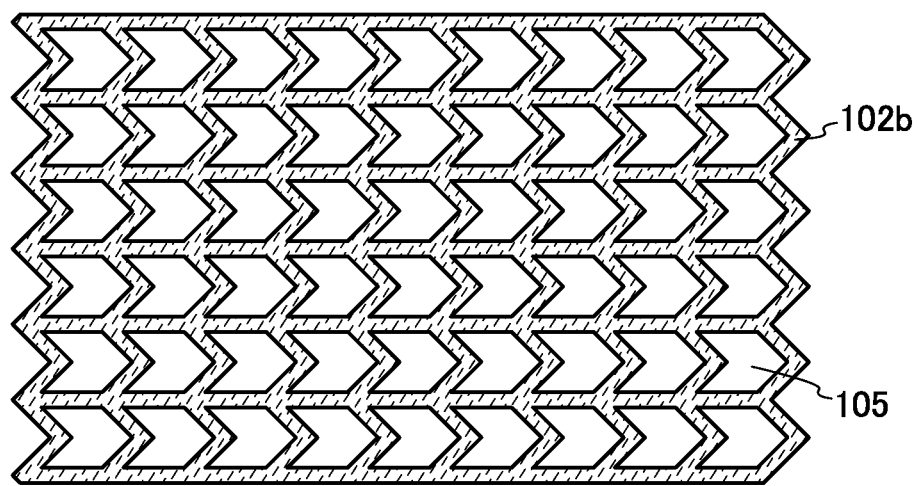
FIGS. 4A and 4B each illustrate a top view of a current collector included in a negative electrode.
Figure 4B:
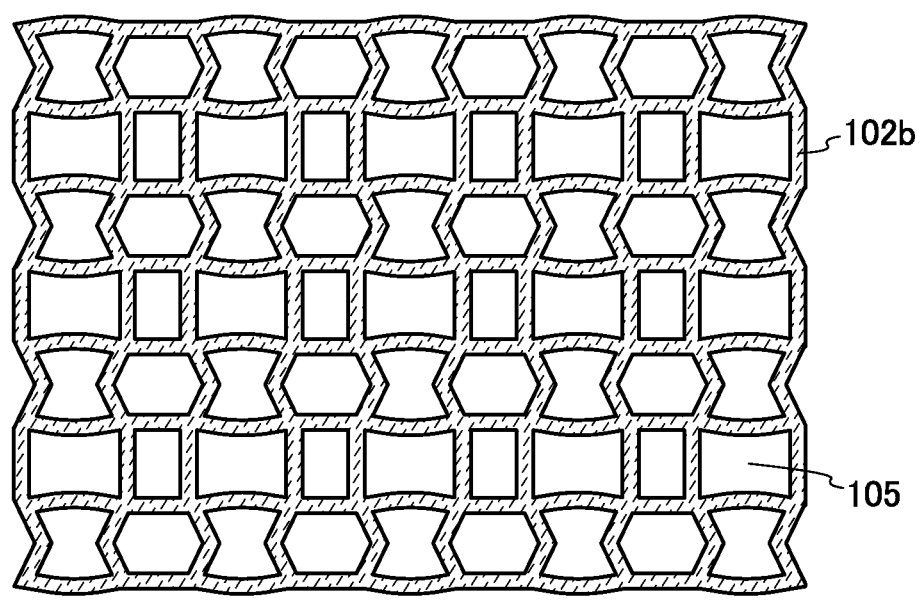

Note that when seen from above, the shape of the cavities 105 of the projecting portion 102b is not necessarily polygonal or circular as in FIGS. 2A and 2B and FIGS. 3A and 3B, and may be partly depressed as illustrated in FIG. 4A or have a curve and a straight line in combination as illustrated in FIG. 4B. In addition, cavities 105 which differ in shape or size may be present in combination. For example, the cavity 105 in the honeycomb structure and the cavity 105 in the truss structure may be present in combination.

Thus, the negative electrode 100 of one embodiment of the present invention has a shape in which a cavity 105 is surrounded by the projecting portion 102b when the active material layer 102 is seen from above. The plurality of cavities 105 in the active material layer 102 can increase the surface area of the active material layer 102, which enables rapid charge/discharge of the power storage device and improves charge/discharge characteristics.

Owing to the plurality of cavities 105 arranged in a matrix (also referred to as a grid shape or a net shape), the shape of the projecting portion 102b can be easily maintained even when the width d of the projecting portion 102b is reduced. Accordingly, even when the projecting portion 102b expands due to charge/discharge, the projecting portion 102b can be prevented from being subjected to separation or breakdown (pulverization). Thus, the reliability of the power storage device can be improved.

Figure 5A:
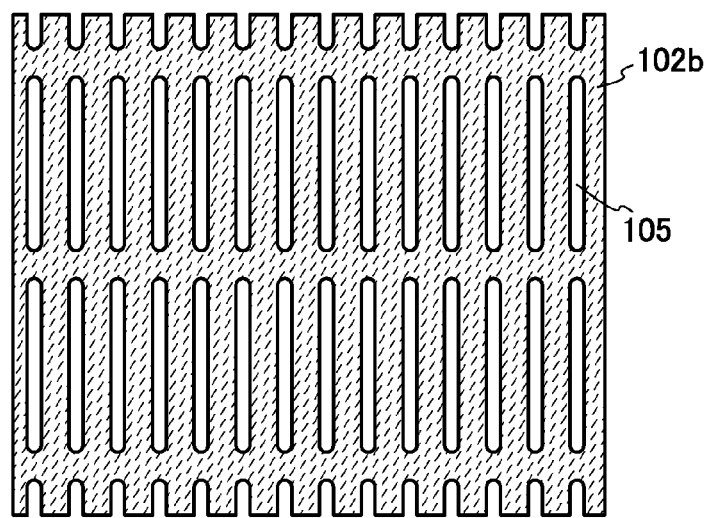
FIGS. 5A to 5C each illustrate a top view of a current collector included in a negative electrode.
Figure 5B:
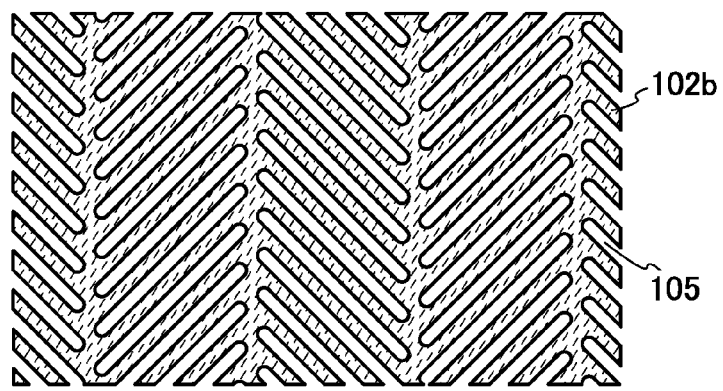
Figure 5C:
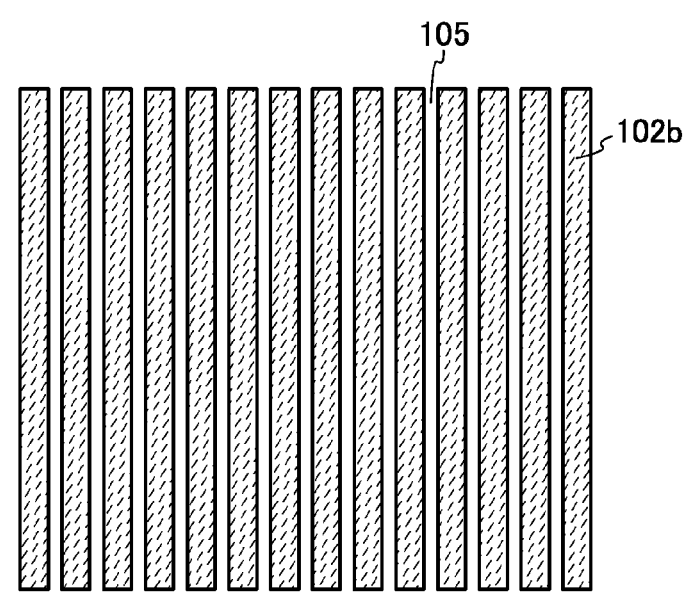
Figure 6A:
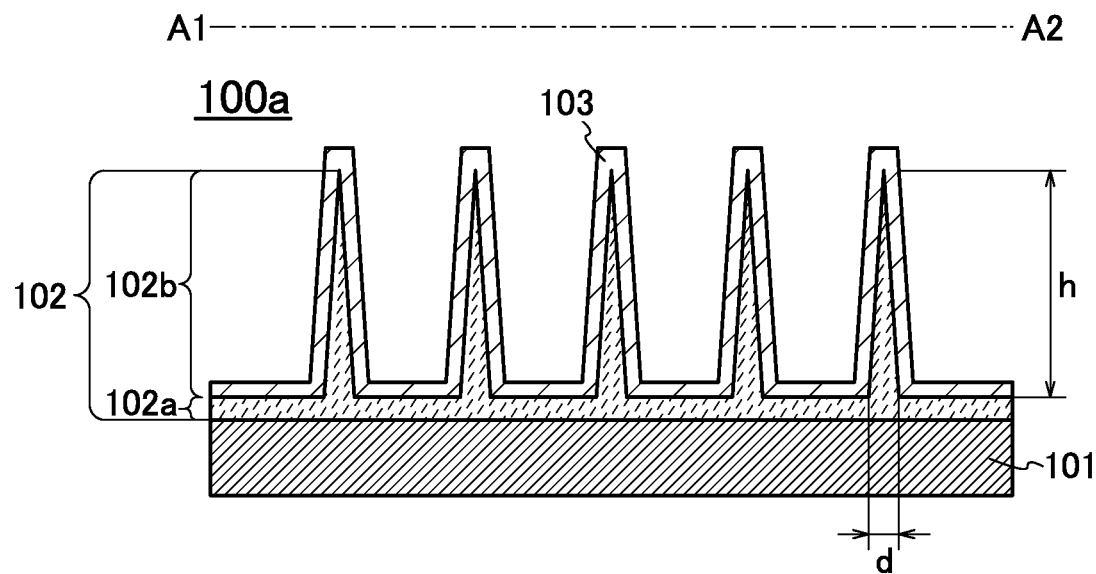
FIGS. 6A and 6B each illustrate a structure example of a negative electrode.
Figure 6B:
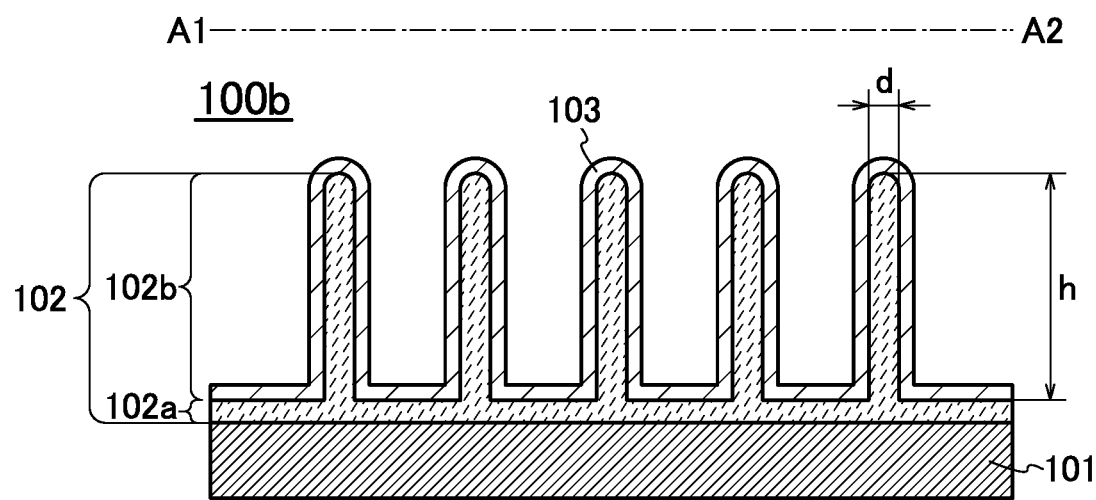

Note that intervals between the voids 105 arranged in a matrix are not necessarily regular and may be irregular. Further, the slit-like cavities 105 may be provided in the active material layer 102, as illustrated in FIGS. 5A and 5B. Furthermore, the cavities 105 may be provided so as to traverse the active material layer 102, as illustrated in FIG. 5C. When the active material layer 102 having the cavities 105 as illustrated in FIG. 5C is seen from above, a cavity 105 is interposed between projecting portions 102b.

The width d of the projecting portion 102b is greater than or equal to 0.1 µm and less than or equal to 1 µm, preferably greater than or equal to 0.2 µm and less than or equal to 0.5 µm. In addition, the height h of the projecting portion 102b is greater than or equal to 0.5 µm and less than or equal to 100 µm, preferably greater than or equal to 1 µm and less than or equal to 50 µm. Further, the value obtained by dividing the height h of the projecting portion 102b by the width d of the projecting portion 102b, i.e., aspect ratio, is greater than or equal to 5, preferably greater than or equal to 10, more preferably greater than or equal to 20.

The projecting portion 102b with a width d greater than or equal to 0.1 µm can increase charge/discharge capacity, and the projecting portion 102b with a width less than or equal to 1 µm can prevent breakdown even when it expands due to charge/discharge. Further, the projecting portion 102b with a height h greater than or equal to 0.5 µm can increase charge/discharge capacity, and the projecting portion 102b with a height less than or equal to 100 µm can prevent breakdown even when it expands due to charge/discharge. Furthermore, as the aspect ratio of the projecting portion 102b is higher, charge/discharge can be more rapid and charge/discharge characteristics can be improved.

Here, the height h of the projecting portion 102b basically means the distance between an end portion of the projecting portion 102b and an interface 131, where the common portion 102a and the projecting portion 102b are in contact with each other (see FIG. 1B). Further, the direction in which the projecting portion 102b extends from the common portion 102a is referred to as a length direction. Furthermore, when the projecting portion 102b is seen from above, the direction along a straight line 133 between centroids 132 of two adjacent cavities 105 is referred to as a width direction (see FIG. 2A). Further, the width d of the projecting portion 102b basically means the longest length in the width direction in an area from the end portion of the projecting portion 102b to the interface 131 where the common portion 102a and the projecting portion 102b are in contact with each other.

Further, when the projecting portion 102b is seen from above, the area of a cavity 105 per unit area including the cavity 105 is greater than or equal to 10%, preferably greater than or equal to 20%. When the area of a cavity 105 per unit area is greater than or equal to 10%, an internal stress, which is due to a change in the volume of the projecting portion 102b during charge/discharge, can be reduced, and thus separation or breakdown of the projecting portion 102b can be more effectively prevented.

Note that the interface between the common portion 102a and the projecting portion 102b is not clear. Hence, in the active material layer 102, a plane that is in contact with the bottom of the deepest depression among depressions (cavities 105) formed in the active material layer 102 and parallel with a plane where the common portion 102a is in contact with the current collector 101 is defined as the interface 131 between the common portion 102a and the projecting portion 102b.

Note that the vertex or edge of the projecting portion 102b may have an acute angle or be curved. An example of the negative electrode including the projecting portion 102b whose vertex has an acute angle is illustrated as a negative electrode 100a in FIG. 6A. In addition, an example of the negative electrode including the projecting portion 102b whose vertex is curved is illustrated as a negative electrode 100b in FIG. 6B.

The graphene 103 functions as an electrically conductive additive. In addition, the graphene 103 may function as an active material.

The graphene 103 includes a single-layer graphene and a multilayer graphene in its category. The graphene 103 has a sheet-like shape with a length of several micrometers.

The term single-layer graphene refers to a sheet of carbon molecules having $sp^2$ bonds with a thickness of one atomic layer and is very thin. A single-layer graphene includes six-membered rings each composed of carbon which are connected in the planar direction, and partly includes a poly-membered ring, such as a seven-membered ring, an eight-membered ring, a nine-membered ring, or a ten-membered ring, which is formed when a carbon-carbon bond in part of a six-membered ring is broken.

Note that the poly-membered ring may include carbon and oxygen. Further, oxygen may be bonded to carbon in the poly-membered ring composed of carbon. In the case where the graphene includes oxygen, a carbon-carbon bond in part of a six-membered ring is broken and an oxygen atom is bonded to carbon whose bond is broken, whereby a poly-membered ring is formed. Therefore, the bond of carbon and oxygen has a gap functioning as a path through which ions can transfer. Thus, as the proportion of oxygen included in the graphene is higher, the proportion of the gaps each functioning as a path through which ions can transfer is increased.

Note that, when the graphene 103 includes oxygen, the proportion of oxygen is greater than or equal to 2 at. % and less than or equal to 11 at. %, preferably greater than or equal to 3 at. % and less than or equal to 10 at. %. As the proportion of oxygen is lower, the electric conductivity of the graphene can be increased. As the proportion of oxygen is higher, more gaps serving as paths of ions in the graphene can be formed.

In the case where the graphene 103 is a multilayer graphene, it includes a plurality of single-layer graphenes, typically, two to hundred single-layer graphenes and thus is very thin. When the single-layer graphene includes oxygen, the distance between adjacent single-layer graphenes (interlayer distance) is greater than 0.34 nm and less than or equal to 0.5 nm, preferably greater than or equal to 0.38 nm and less than or equal to 0.42 nm, more preferably greater than or equal to 0.39 nm and less than or equal to 0.41 nm. In a general graphite, the interlayer distance between adjacent single-layer graphenes is 0.34 nm. In the graphene 103, the interlayer distance is longer than that in a general graphite and accordingly ions can easily transfer in a direction parallel with a surface of the single-layer graphene. Further, the graphene 103 includes oxygen and formed of a single-layer graphene or a multilayer graphene in which the poly-membered ring is formed and thus has gaps in places. Thus, in the case where the graphene 103 is a multilayer graphene, ions can transfer in the direction parallel with a surface of the single-layer graphene, i.e., through a gap between the single-layer graphenes, and in the direction perpendicular to a surface of the graphene, i.e., through a cavity gap formed in each of the single-layer graphenes.

In the case where silicon is used as a negative electrode active material, the theoretical occlusion capacity is higher than in the case where a graphite is used as an active material; thus, use of silicon leads to downsizing of the power storage device.

Further, in the active material layer 102 of the negative electrode 100, since the projecting portion 102b projects from the common portion 102a, the surface area is larger than in a plate-like active material. In addition, since the active material layer 102 has the plurality of cavities 105 and also is covered with the graphene, even when the active material layer 102 expands due to charging, separation or breakdown of the active material can be prevented. Thus, in the case where the negative electrode 100 described in this embodiment is used for a power storage device, charge/discharge can be performed at high speed and prevented from causing separation or breakdown of the active material. Accordingly, a highly reliable power storage device which is unlikely to be degraded by charge/discharge and has much better cycle characteristics can be manufactured.

Further, in the power storage device, when the surface of the active material layer 102 is in contact with an electrolyte, the electrolyte and the active material react with each other to form a film over the surface of the active material. The film is called a solid electrolyte interface (SEI) which is considered necessary for relieving reaction between the active material and the electrolyte and for stabilization. However, when the thickness of the film increases, carrier ions cannot be easily occluded by the active material, which might reduce the conductivity of carrier ions between the active material and the electrolyte, for example.

The graphene 103 covering the active material layer 102 can suppress the increase in thickness of the film, which prevents the decrease in conductivity of carrier ions.

Further, since a graphene has high electric conductivity, the graphene covering silicon enables electrons to transfer at sufficiently high speed in the graphene. In addition, since a graphene has a thin sheet-like shape, the graphene covering the projecting portion increases the amount of the active material in the active material layer 102 and makes transfer of carrier ions easier than a graphite. Accordingly, the conductivity of carrier ions can be increased, reactivity between silicon used as the active material and carrier ions can be increased, and carrier ions can be easily occluded by the active material. Accordingly, a power storage device including the above negative electrode can perform rapid charge/discharge.

Note that a silicon oxide layer (not illustrated) may be provided between the active material layer 102 and the graphene 103. When the silicon oxide layer is provided over the active material layer 102, ions which are carriers are inserted into silicon oxide in charging of the power storage device, so that a silicate compound, e.g., alkali metal silicate such as $Li_4SiO_4$, $Na_4SiO_4$, or $K_4SiO_4$, alkaline-earth metal silicate such as $Ca_2SiO_4$, $Sc_2SiO_4$, or $Ba_2SiO_4$, $Be_2SiO_4$, $Mg_2SiO_4$, or the like is formed. Such a silicate compound can serve as a path through which carrier ions transfer. Furthermore, when the silicon oxide layer is provided, expansion of the active material layer 102 can be suppressed and accordingly separation or breakdown of the active material layer 102 can be suppressed while the charge/discharge capacity is maintained. Note that in discharging after charging, not all metal ions serving as carrier ions are released from the silicate compound formed in the silicon oxide layer and part of the metal ions remain, so that the silicon oxide layer is a mixture layer of silicon oxide and the silicate compound.

In addition, the thickness of the silicon oxide layer is preferably greater than or equal to 2 nm and less than or equal to 10 nm. With the thickness of the silicon oxide layer being greater than or equal to 2 nm, expansion of the active material layer 102 due to charge/discharge can be relieved. With the thickness of the silicon oxide layer being less than or equal to 10 nm, carrier ions can transfer easily, which can prevent a reduction in charge capacity. When the silicon oxide layer is provided over the active material layer 102, expansion and contraction of the active material layer 102 in charge/discharge can be relieved, so that separation or breakdown of the active material layer 102 can be prevented.

Figure 7A:
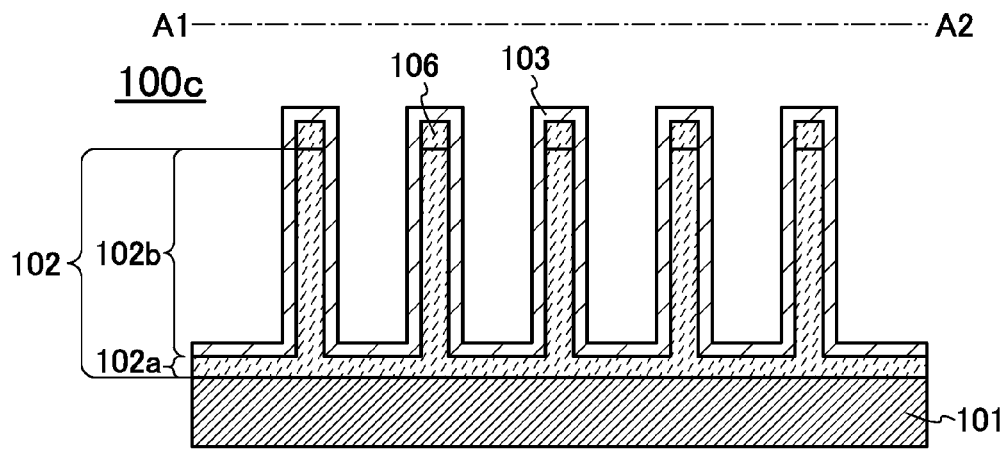
FIGS. 7A to 7C each illustrate a structure example of a negative electrode.

Further, as in the negative electrode 100c illustrated in FIG. 7A, a protective layer 106 may be provided between the graphene 103 and the vertex of the projecting portion 102b in the active material layer 102.

For the protective layer 106, an electrically conductive layer, a semiconductor layer, or an insulating layer can be used as appropriate. The thickness of the protective layer 106 is preferably greater than or equal to 100 nm and less than or equal to 10 μm. When the protective layer 106 is formed using a material whose etching rate is lower than that of the material for the active material layer 102, the protective layer 106 serves as a hard mask in formation of the cavities 105.

Figure 7B:
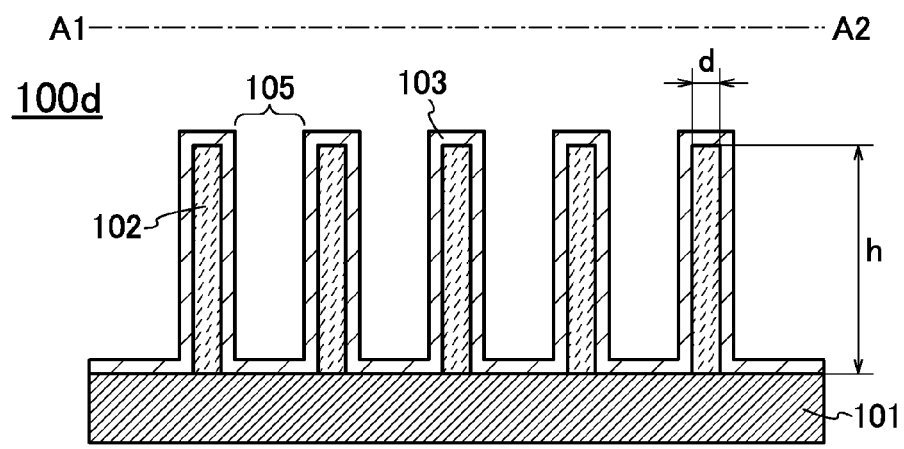

Note that as in a negative electrode 100d illustrated in FIG. 7B, over the current collector 101, the active material layer 102 having the plurality of cavities 105 may be provided without the common portion 102a while the graphene 103 is formed over the current collector 101 and the active material layer 102.

Since the graphene 103 is in contact with part of the current collector 101, electrons can easily flow in the graphene 103, so that reactivity between carrier ions and silicon can be increased.

Figure 7C:
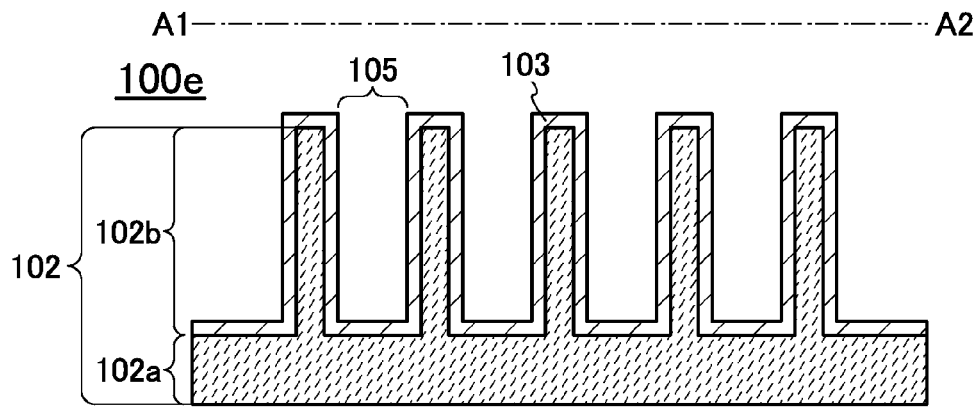

Further, the common portion 102a can also be used as the current collector 101 as in a negative electrode 100e illustrated in FIG. 7C. When the common portion 102a is used as the current collector 101, the productivity of the negative electrode can be increased. Thus, the productivity of the power storage device using the negative electrode can be increased.

Figure 8A:
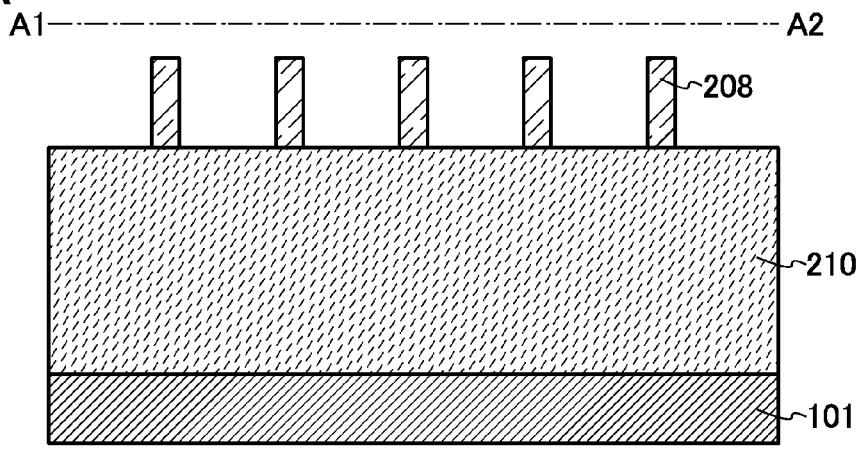
FIGS. 8A to 8C illustrate a method of manufacturing a negative electrode.

Next, a method of manufacturing the negative electrode 100 is described with reference to the cross-sectional views in FIGS. 8A to 8C.

First, the active material layer 102 is formed over the current collector 101. For the current collector 101 and the active material layer 102, any of the materials described above can be used. In this embodiment, a sheet of titanium is used as the current collector 101. Further, in this embodiment, a silicon layer 210 which becomes the active material layer 102 is formed over the current collector 101 by a CVD method (see FIG. 8A).

Figure 8B:
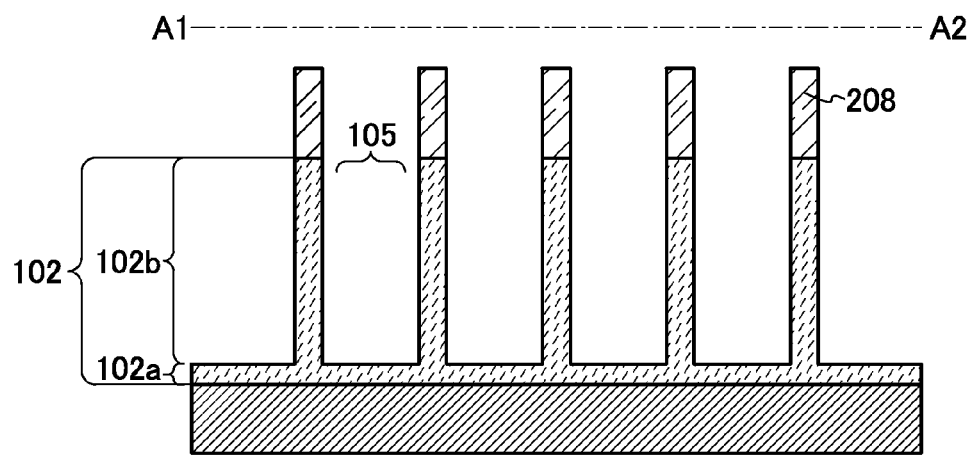
Figure 8C:
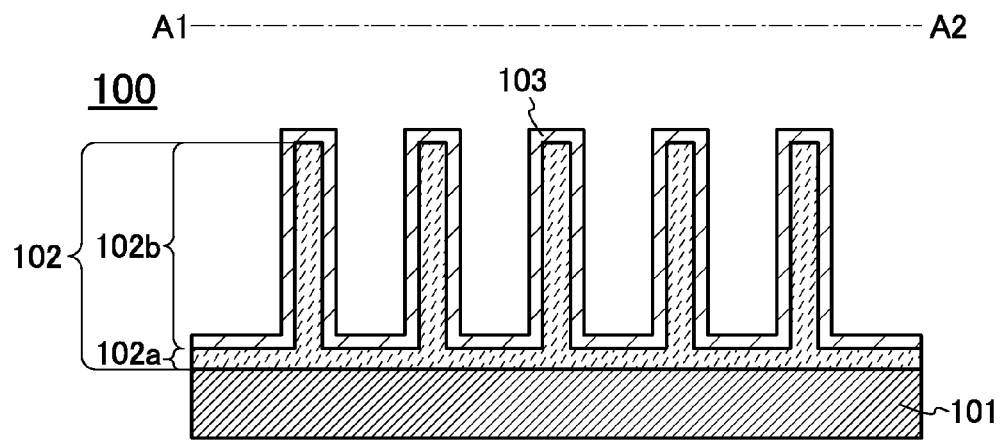

Next, the silicon layer 210 is partly etched using a resist mask 208, so that the active material layer 102 having the common portion 102a, the projecting portion 102b, and the cavity 105 are formed (see FIG. 8B).

The resist mask 208 can be formed by a photolithography method. The resist mask 208 can be formed by an inkjet method, a printing method, or the like, instead of a photolithography method.

As a method of etching the silicon layer 210, a dry etching method or a wet etching method can be used as appropriate. Note that when a Bosch process which is a dry etching method is used, a high projecting portion can be formed.

For example, the silicon layer 210 is partly etched with an inductively coupled plasma (ICP) apparatus by using, as an etching gas, chlorine, hydrogen bromide, and oxygen, whereby the active material layer 102 including the common portion 102a and the projecting portion 102b can be formed. The etching time is adjusted such that the common portion 102a remains. The flow ratio of the etching gas may be adjusted as appropriate. For example, the flow rate ratio of chlorine, hydrogen bromide, and oxygen can be 10:15:3.

After the etching is completed, the resist mask 208 is removed. Over the current collector 101, the negative electrode 100 including the active material layer 102 which has a surface having the plurality of cavities can be fabricated.

Next, the graphene 103 is formed over the active material layer 102.

As a method of forming the graphene 103, there are a gas phase method and a liquid phase method. In the gas phase method, after nickel, iron, gold, copper, or an alloy containing such a metal over the active material layer 102 is formed as a nucleus, a graphene is grown from the nucleus in an atmosphere containing hydrocarbon such as methane or acetylene. In the liquid phase method, a dispersion liquid containing graphene oxide is used to provide graphene oxide over the surface of the active material layer 102 and the graphene oxide is then reduced to form a graphene.

The dispersion liquid containing graphene oxide is formed by a method in which graphene oxide is dispersed in a solvent, a method in which a graphite is oxidized in a solvent and then graphite oxide is separated into graphene oxide, and the like. In this embodiment, the dispersion liquid containing graphene oxide which is formed by the method in which graphite is oxidized and then graphite oxide is separated into graphene oxide is used to form the graphene 103 over the active material layer 102.

In this embodiment, graphene oxide is formed by an oxidation method called a Hummers method. A Hummers method is as follows: a sulfuric acid solution of potassium permanganate, hydrogen peroxide water, or the like is mixed into single crystal graphite powder to cause oxidation reaction; thus, a mixed solution containing graphite oxide is formed. Because of the oxidation of carbon in graphite, graphite oxide has a functional group such as an epoxy group, a carbonyl group such as a carboxyl group, or a hydroxyl group. Therefore the interlayer distance between adjacent graphenes of a plurality of graphenes in graphite oxide is longer than in graphite. Then, ultrasonic vibration is applied to the mixed solution containing graphite oxide to cleave graphite oxide in which the interlayer distance is long, so that graphene oxide can be separated and the dispersion liquid containing graphene oxide can be formed. However, a method of forming graphene oxide other than a Hummers method can be used as appropriate.

Note that graphene oxide has an epoxy group, a carbonyl group such as a carboxyl group, a hydroxyl group, or the like. Such a substituent has high polarity, so that graphene oxides are likely to disperse in a liquid having a polarity. In particular, when graphene oxide has a carboxyl group, hydrogen is ionized, and consequently, graphene oxide is ionized and more likely to disperse. Accordingly, in a later step, graphene oxide can be provided uniformly over the surface of the active material layer 102. Even when the surface of the active material layer 102 contains silicon oxide, graphene oxide can be uniformly provided in the surface.

As a method of soaking the active material layer 102 in the dispersion liquid containing graphene oxide to provide graphene oxide over the active material layer 102, a coating method, a spin coating method, a dipping method, a spray method, an electrophoresis method, or the like may be employed. Alternatively, these methods may be combined as appropriate. With the use of an electrophoresis method, ionized graphene oxide can be electrically transferred to the active material, whereby graphene oxide can be provided also on a surface of the common portion which is not in contact with the projecting portion 102b. Therefore graphene oxide can be provided uniformly over the surfaces of the common portion and the projecting portion 102b even when the projecting portion 102b is high.

A method of reducing the graphene oxide provided over the active material layer 102 is heating in a vacuum, an atmosphere of an inert gas (e.g., nitrogen or a rare gas), or the like at a temperature greater than or equal to 150° C., preferably a temperature which is greater than or equal to 200° C. and less than or equal to the upper limit of the temperature range in which the active material layer 102 can withstand. By being heated at a higher temperature for a longer time, graphene oxide is reduced to a higher extent so that a graphene with high purity (i.e., with a low concentration of elements other than carbon) can be obtained. Another method is soaking the graphene oxide in a reducing solution.

Although a sulfone group and the like are also bonded to graphite oxide since graphite is treated with sulfuric acid in a Hummers method, decomposition (release) is started at about 300° C. Thus, graphene oxide is preferably reduced at 300° C. or more in a method of reducing graphene oxide by heating.

Through the above-described reduction treatment, adjacent graphenes are bonded to each other to form a huge net-like or sheet-like shape. Further, through the reduction treatment, gaps are formed in the graphenes due to the release of oxygen. Furthermore, the graphenes overlap with each other in parallel with a surface of a substrate. As a result, the graphene in which ions can transfer between layers and in the gaps is formed. Thus, the negative electrode 100 in which the graphene is provided over the active material layer 102 can be formed (see FIG. 8C).

The negative electrode 100c illustrated in FIG. 7A can be formed as follows. A protective layer is formed over the silicon layer 210, the resist mask 208 is formed over the protective layer, and separated protective layers 106 are formed with the use of the resist mask 208 (see FIG. 7A). After that, with the use of the resist mask 208 and the separated protective layers as masks, part of the silicon layer 210 is selectively etched.

Here, if the projecting portion 102b is high, or subjected to etching for a long time, the resist mask is gradually thinned in the etching step and partly removed to expose the silicon layer 210, and consequently the projecting portion 102b varies in height. However, the use of the separated protective layers 106 as a hard mask can prevent the exposure of the silicon layer 210, and accordingly the projecting portion 102b varies less in height.

Alternatively, the negative electrode 100c illustrated in FIG. 7C can be formed in such a way that a single crystal silicon substrate or a polycrystalline silicon substrate is partly etched to form the projecting portion 102b. When an n-type silicon substrate doped with phosphorus or a p-type silicon substrate doped with boron is used as the silicon substrate, the common portion 102a can be used as the current collector 101.

This embodiment can be combined with any of the other embodiments as appropriate.

(Embodiment 2)

In this embodiment, examples of a structure of a power storage device and a manufacturing method thereof are described.

First, examples of a positive electrode and a manufacturing method thereof are described.

Figure 9A:
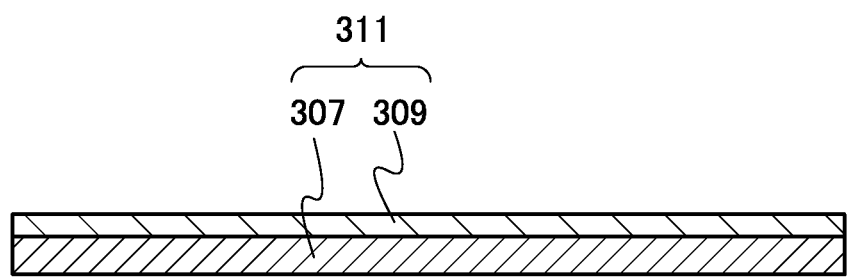
FIGS. 9A to 9C illustrate a structure example of a positive electrode.

FIG. 9A is a cross-sectional view of a positive electrode 311. In the positive electrode 311, a positive electrode active material layer 309 is formed over a positive electrode current collector 307.

As the positive electrode current collector 307, a material having high electric conductivity such as platinum, aluminum, copper, titanium, or stainless steel can be used. The positive electrode current collector 307 can have a foil-like shape, a plate-like shape, a net-like shape, or the like as appropriate.

As the positive electrode active material layer 309, $LiFeO_2$, $LiCoO_2$, $LiNiO_2$, $LiMn_2O_4$, $V_2O_5$, $Cr_2O_5$, $MnO_2$, or the like can be used as a material.

Alternatively, an olivine-type lithium-containing composite oxide (a general formula $LiMPO_4$ (M is one or more of Fe(II), Mn(II), Co(II), and Ni(II)) can be used. Typical examples of the general formula $LiMPO_4$, which can be used as a material, are lithium compounds such as $LiFePO_4$, $LiNiPO_4$, $LiCoPO_4$, $LiMnPO_4$, $LiFe_aNi_bPO_4$, $LiFe_aCo_bPO_4$, $LiFe_aMn_bPO_4$, $LiNi_aCo_bPO_4$, $LiNi_aMn_bPO_4$ ($a+b\leq1$, $0<a<1$, and $0<b<1$), $LiFe_cNi_dCo_ePO_4$, $LiFe_cNi_dMn_ePO_4$, $LiNi_cCo_dMn_ePO_4$ ($c+d+e\leq1$, $0<c<1$, $0<d<1$, and $0<e<1$), and $LiFe_fNi_gCo_hMn_iPO_4$ ($f+g+h+i\leq1$, $0<f<1$, $0<g<1$, $0<h<1$, and $0<i<1$).

Alternatively, a lithium-containing composite oxide such as a general formula $Li_{(2-j)}MSiO_4$ (M is one or more of Fe(II), Mn(II), Co(II), and Ni(II), $0\leq j\leq 2$) can be used. Typical examples of the general formula $Li_{(2-j)}MSiO_4$, which can be used as a material, are lithium compounds such as $Li_{(2-j)}FeSiO_4$, $Li_{(2-j)}NiSiO_4$, $Li_{(2-j)}CoSiO_4$, $Li_{(2-j)}MnSiO_4$, $Li_{(2-j)}Fe_aNi_bSiO_4$, $Li_{(2-j)}Fe_aCo_bSiO_4$, $Li_{(2-j)}Fe_kMn_lSiO_4$, $Li_{(2-j)}Ni_kCo_lSiO_4$, $Li_{(2-j)}Ni_kMn_lSiO_4$ ($k+l\leq1$, $0<k<1$, and $0<l<1$), $Li_{(2-j)}Fe_mNi_nCo_qSiO_4$, $Li_{(2-j)}Fe_mNi_nMn_qSiO_4$, $Li_{(2-j)}Ni_mCo_nMn_qSiO_4$ (m+n+q≤1, 0<m<1, 0<n<1, and 0<q<1), and $Li_{(2-j)}Fe_rNi_sCo_tMn_uSiO_4$ (r+s+t+u≤1, 0<r<1, 0<s<1, 0<t<1, and 0<u<1).

Instead of lithium in the lithium compound and the lithium-containing composite oxide, an alkali metal (e.g., sodium or potassium), an alkaline-earth metal (e.g., calcium, strontium, or barium), beryllium, or magnesium may be used as the positive electrode active material layer 309 when carrier ions are alkali metal ions other than lithium ions, such as alkaline-earth metal ions, beryllium ions, or magnesium ions.

Figure 9B:
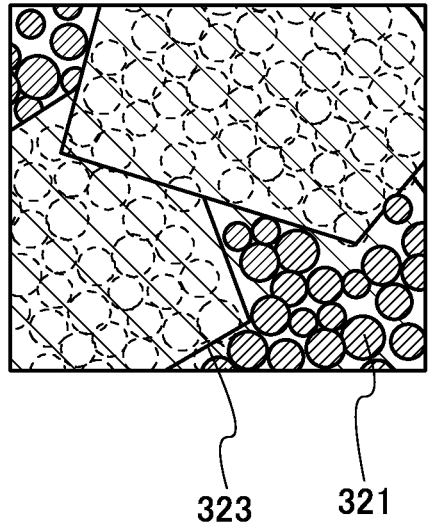

FIG. 9B is a plan view of the positive electrode active material layer 309 including positive electrode active materials 321, which are particles capable of occluding and releasing carrier ions, and graphenes 323, which at least partly surround the plurality of particles of the positive electrode active materials 321 while covering the particles. The graphenes 323 cover surfaces of the plurality of particles of the positive electrode active materials 321. The positive electrode active materials 321 may partly be exposed. The graphene 103 described in Embodiment 1 can be used as the graphene 323 as appropriate.

The particle size of a positive electrode active material 321 is preferably greater than or equal to 20 nm and less than or equal to 100 nm. Note that the particle size of the positive electrode active material 321 is preferably small because electrons transfer in the positive electrode active materials 321.

Use of both the graphene and the positive electrode active material covered with a graphite layer is preferred, in which case carriers transfer hopping between the positive electrode active materials to cause current flow, although sufficient characteristics can be obtained even when surfaces of the positive electrode active materials 321 are not covered with a graphite layer.

Figure 9C:
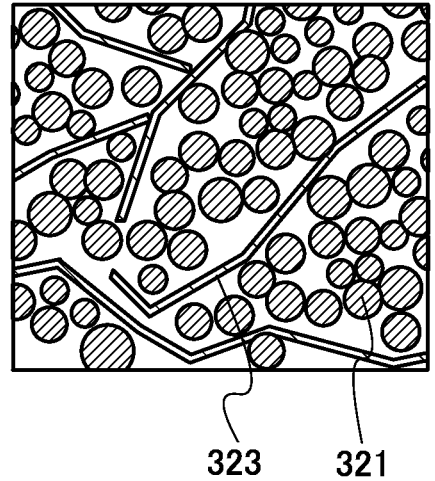

FIG. 9C is a cross-sectional view of part of the positive electrode active material layer 309 in FIG. 9B. The positive electrode active material layer 309 includes the positive electrode active materials 321 and the graphenes 323 which partly cover the positive electrode active materials 321. According to observation, the graphenes 323 have linear shapes in cross section. A plurality of particles of the positive electrode active materials is at least partly surrounded with one graphene or the plurality of graphenes. That is, the plurality of particles of the positive electrode active materials exists within one graphene or among the plurality of graphenes. It is possible that the graphene has a bag-like shape and the plurality of particles of the positive electrode active materials is at least partly surrounded with the bag-like portion. In some cases, the positive electrode active materials are not covered with the graphenes and partly exposed.

The desired thickness of the positive electrode active material layer 309 is determined to be greater than or equal to 20 μm and less than or equal to 100 μm. It is preferable to adjust the thickness of the positive electrode active material layer 309 as appropriate so that a crack and separation are not caused.

Note that the positive electrode active material layer 309 may contain acetylene black particles having a volume 0.1 times to 10 times as large as that of the graphene, carbon having a one-dimensional expansion (e.g., carbon nanofibers), or other known binders.

As an example of the positive electrode active material, there is a material whose volume is expanded by occlusion of ions serving as carriers. Hence, the positive electrode active material layer including such a material gets friable and is partly broken by charge/discharge, which reduces reliability of the power storage device. However, even when the volume of the positive electrode active materials is expanded by charge/discharge, since the graphenes cover the periphery of the positive electrode active materials, dispersion of the positive electrode active materials and the breakdown of the positive electrode active material layer can be prevented. That is, the graphene has a function of maintaining the bond between the positive electrode active materials even when the volume of the positive electrode active materials is increased or decreased by charge/discharge.

The graphene 323 is in contact with the plurality of particles of the positive electrode active materials and also serves as an electrically conductive additive. Further, the graphene 323 has a function of holding the positive electrode active materials 321 capable of occluding and releasing carrier ions. Thus, the proportion of the positive electrode active materials in the positive electrode active material layer can be increased, so that the charge/discharge capacity of a power storage device can be increased.

Next, a method of manufacturing the positive electrode active material layer 309 is described.

A slurry containing the particles of the positive electrode active materials and graphene oxide is formed. Then, after the positive electrode current collector is coated with the slurry, heating is performed in a reducing atmosphere for reduction treatment so that the positive electrode active materials are baked and part of oxygen is released from graphene oxide to form gaps in the graphene, as in the method of forming the graphene, which is described in Embodiment 1. Note that oxygen in graphene oxide is not entirely reduced and partly remains in the graphene. Through the above process, the positive electrode active material layer 309 can be formed over the positive electrode current collector 307. Consequently, the positive electrode active material layer has higher electric conductivity.

Graphene oxide contains oxygen and therefore is negatively charged in a polar solvent. As a result of being negatively charged, graphene oxide is dispersed. Accordingly, the positive electrode active materials contained in the slurry are not easily aggregated, so that baking can be prevented from increasing the particle size of the positive electrode active material. Consequently, electrons are easy to transfer in the positive electrode active materials, which increases the electric conductivity of the positive electrode active material layer.

Figure 10A:
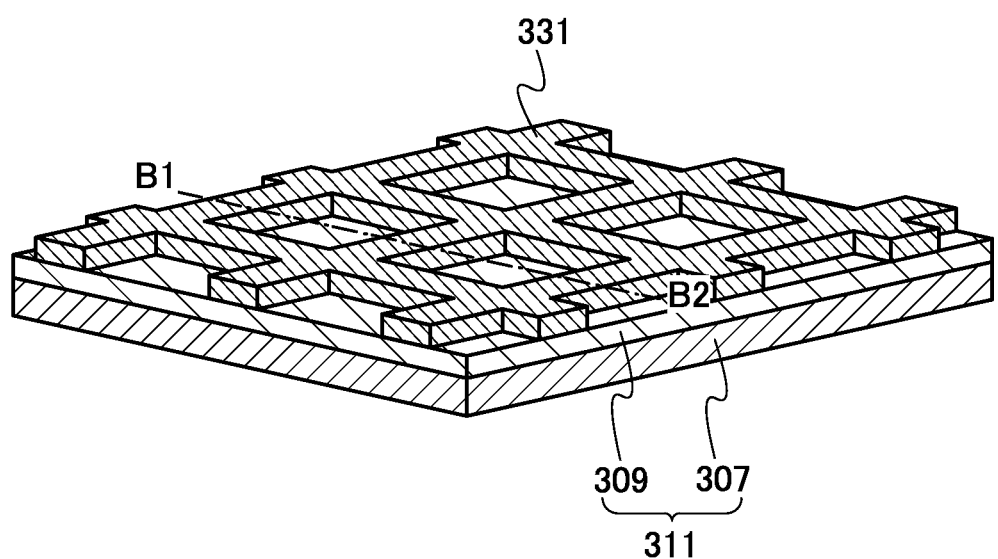
FIGS. 10A and 10B illustrate a structure example of a positive electrode.
Figure 10B:
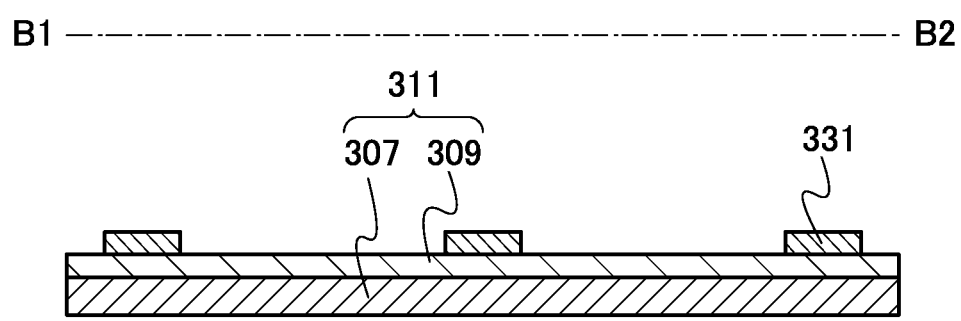

As illustrated in FIGS. 10A and 10B, a spacer 331 may be provided over a surface of the positive electrode 311. FIG. 10A is a perspective view of the positive electrode including the spacer, and FIG. 10B is a cross-sectional view along dashed and dotted line B1-B2 in FIG. 10A.

As illustrated in FIGS. 10A and 10B, in the positive electrode 311, the positive electrode active material layer 309 is provided over the positive electrode current collector 307. The spacer 331 is provided over the positive electrode active material layer 309.

The spacer 331 has an insulating property and can be formed using a material which does not react with an electrolyte. Specific examples of the material are an organic material such as an acrylic resin, an epoxy resin, a silicone resin, polyimide, or polyamide, low-melting-point glass such as glass paste, glass frit, or glass ribbon, and the like. When the spacer 331 is provided over the positive electrode 311, a separator is not needed in the power storage device completed later. Consequently, the number of components of the power storage device and the cost can be reduced.

The spacer 331 preferably has a planar shape which exposes part of the positive electrode active material layer 309, such as lattice-like shape or a closed circular or polygonal loop shape. With such a shape, contact between the positive electrode and the negative electrode can be prevented, and the transfer of carrier ions between the positive electrode and the negative electrode can be promoted.

The thickness of the spacer 331 is preferably greater than or equal to 1 µm and less than or equal to 5 µm, preferably greater than or equal to 2 µm and less than or equal to 3 µm. In this case, the distance between the positive electrode and the negative electrode and the transfer distance of carrier ions between the positive electrode and the negative electrode can be shorter than in the case where a separator having a thickness of several tens of micrometers is provided between the positive electrode and the negative electrode as in a conventional power storage device. Accordingly, carrier ions included in the power storage device can be efficiently used for charge/discharge.

The spacer 331 can be formed by a printing method, an ink jetting method, or the like as appropriate.

Next, a structure of the power storage device and a manufacturing method thereof are described.

One embodiment of a lithium secondary battery in this embodiment which is a typical example of power storage devices will be described with reference to FIG. 11. Here, a cross-sectional structure of the lithium secondary battery is described below.

Figure 11:
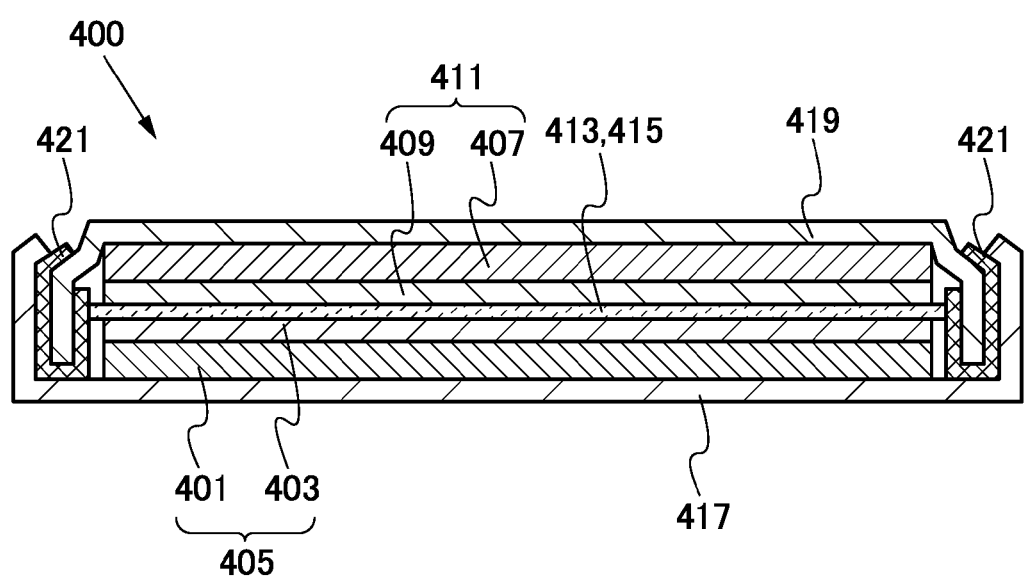
FIG. 11 illustrates an example of a power storage device.

FIG. 11 is a cross-sectional view of the lithium secondary battery.

A lithium secondary battery 400 includes a negative electrode 405 including a negative electrode current collector 401 and a negative electrode active material layer 403, a positive electrode 411 including a positive electrode current collector 407 and a positive electrode active material layer 409, and a separator 413 provided between the negative electrode 405 and the positive electrode 411. Note that the separator 413 includes an electrolyte 415. The negative electrode current collector 401 is connected to an external terminal 417 and the positive electrode current collector 407 is connected to an external terminal 419. An end portion of the external terminal 419 is embedded in a gasket 421. In other words, the external terminals 417 and 419 are insulated from each other with the gasket 421.

The negative electrode described in Embodiment 1 can be used as appropriate as the negative electrode 405.

As the positive electrode current collector 407 and the positive electrode active material layer 409, the positive electrode current collector 307 and the positive electrode active material layer 309 which are described in this embodiment can be used as appropriate.

As the separator 413, an insulating porous material is used. Typical examples of the separator 413 are cellulose (paper), polyethylene, polypropylene, and the like.

Note that the separator 413 is not necessarily provided when a positive electrode including a spacer over a positive electrode active material layer as illustrated in FIGS. 10A and 10B is used as the positive electrode 411.

As a solute of the electrolyte 415, a material including carrier ions is used. Typical examples of the solute of the electrolyte are lithium salts such as $LiClO_4$, $LiAsF_6$, $LiBF_4$, $LiPF_6$, and $Li(C_2F_5SO_2)_2N$.

Instead of lithium in the above lithium salts, an alkali metal (e.g., sodium or potassium), an alkaline-earth metal (e.g., calcium, strontium, or barium), beryllium, or magnesium may be used as the solute of the electrolyte 415 when carrier ions are alkali metal ions other than lithium ions, such as alkaline-earth metal ions, beryllium ions, or magnesium ions.

As a solvent of the electrolyte 415, a material in which carrier ions can transfer is used. As the solvent of the electrolyte 415, an aprotic organic solvent is preferably used. Typical examples of an aprotic organic solvent are ethylene carbonate, propylene carbonate, dimethyl carbonate, diethyl carbonate, γ-butyrolactone, acetonitrile, dimethoxyethane, tetrahydrofuran, and the like, one or more of which can be used. When a gelled polymer material is used as the solvent of the electrolyte 415, safety against liquid leakage or the like is increased and the lithium secondary battery 400 can also be thinner and more lightweight. Typical examples of a gelled polymer material are a silicon gel, an acrylic gel, an acrylonitrile gel, polyethylene oxide, polypropylene oxide, a fluorine-based polymer, and the like. The use of one or more of ionic liquids (room temperature molten salts) which are less likely to burn and volatilize as a solvent of the electrolyte 415 can prevent a power storage device from exploding or catching fire even when the power storage device internally shorts out or the internal temperature increases due to overcharging or the like.

As the electrolyte 415, a solid electrolyte such as $Li_3PO_4$ can be used.

For the external terminals 417 and 419, a metal member such as a stainless steel plate or an aluminum plate can be used as appropriate.

Note that in this embodiment, a coin-type lithium secondary battery is given as the lithium secondary battery 400; however, any of lithium secondary batteries with various shapes, such as a sealing-type lithium secondary battery, a cylindrical lithium secondary battery, and a square-type lithium secondary battery, can be used. Further, a structure in which a plurality of positive electrodes, a plurality of negative electrodes, and a plurality of separators are stacked or rolled may be employed.

Next, a method of manufacturing the lithium secondary battery 400 described in this embodiment is described.

In accordance with the manufacturing method described in Embodiment 1 and this embodiment, the negative electrode 405 and the positive electrode 411 are formed as appropriate.

Next, the negative electrode 405, the separator 413, and the positive electrode 411 are impregnated with the electrolyte 415. Then, the negative electrode 405, the separator 413, the gasket 421, the positive electrode 411, and the external terminal 419 are stacked in this order over the external terminal 417, and the external terminals 417 and 419 are crimped to each other with a "coin cell crimper". Thus, the coin-type lithium secondary battery can be manufactured.

Note that a spacer and a washer may be provided between the external terminal 417 and the negative electrode 405 or between the external terminal 419 and the positive electrode 411 in order to enhance connection between the external terminal 417 and the positive electrode 411 or between the external terminal 419 and the negative electrode 405.

This embodiment can be combined with any of the other embodiments as appropriate.

(Embodiment 3)

A power storage device in accordance with one embodiment of the present invention can be used as a power supply of various electronic appliances which are driven by electric power.

Specific examples of electronic appliances using the power storage device of one embodiment of the present invention are display devices, lighting devices, desktop personal computers, laptop personal computers, image playback devices which reproduce a still image or a moving image stored in recording media such as digital versatile discs (DVDs), mobile phones, portable game machines, portable information terminals, e-book readers, cameras such as video cameras and digital still cameras, high-frequency heating apparatuses such as microwaves, electric rice cookers, electric washing machines, air-conditioning systems such as air conditioners, electric refrigerators, electric freezers, electric refrigerator-freezers, freezers for preserving DNA, dialysis devices, and the like. Another examples of the electronic appliances are moving objects driven by an electric motor using power from a power storage device. Examples of the moving objects are electric vehicles, hybrid vehicles which include both an internal-combustion engine and an electric motor, motorized bicycles including motor-assisted bicycles, and the like.

In the electronic appliances, the power storage device of one embodiment of the present invention can be used as a power storage device for supplying power for almost the whole power consumption (such a power storage device is referred to main power supply). Alternatively, in the electronic appliances, the power storage device of one embodiment of the present invention can be used as a power storage device which can supply power to the electronic appliances when the supply of power from the main power supply or a commercial power supply is stopped (such a power storage device is referred to as an uninterruptible power supply). Further alternatively, in the electronic appliances, the power storage device of one embodiment of the present invention can be used as a power storage device for supplying power to the electronic appliances at the same time as the power supply from the main power supply or a commercial power supply (such a power storage device is referred to as an auxiliary power supply).

Figure 12:
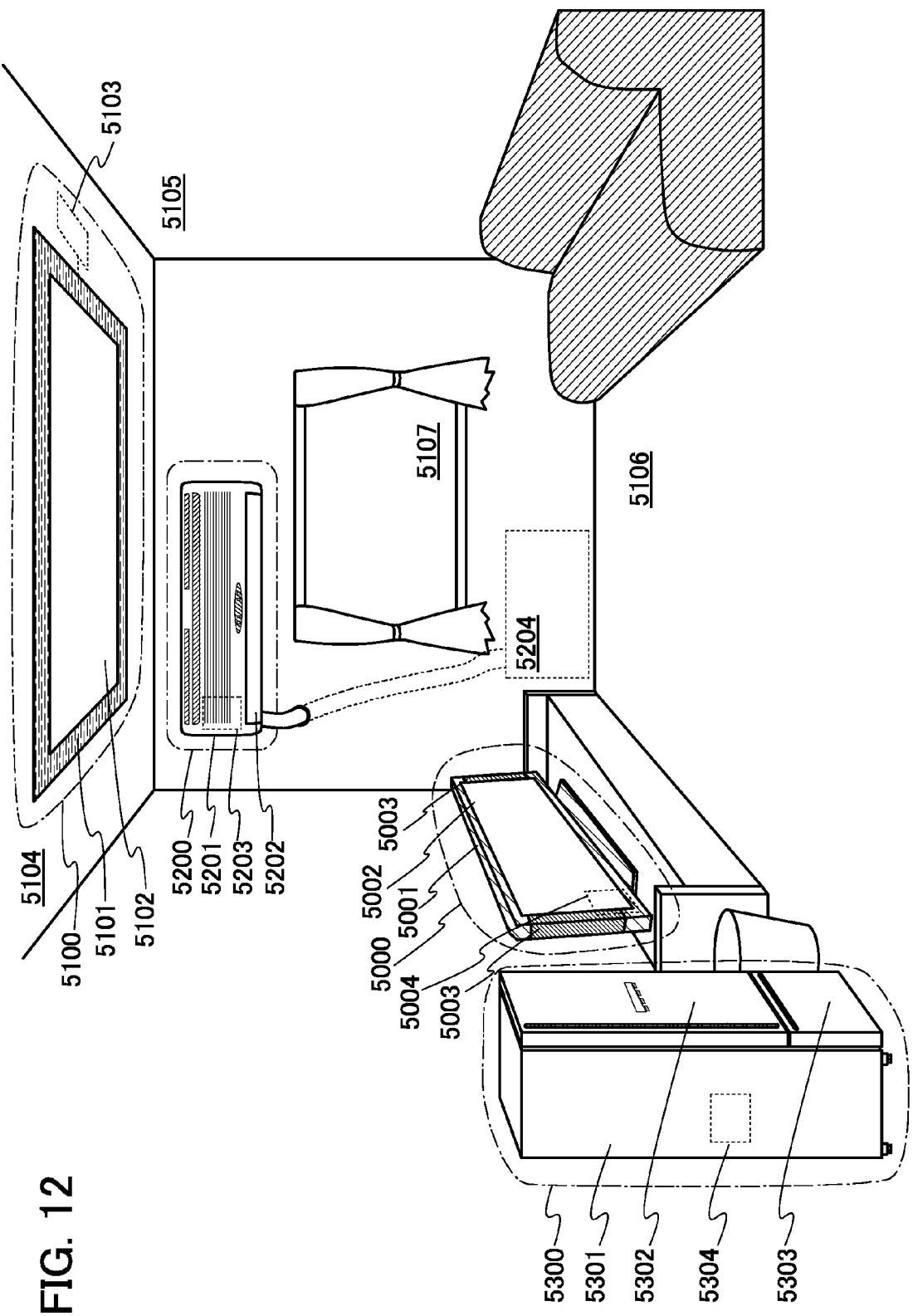
FIG. 12 illustrates examples of electronic appliances.

FIG. 12 illustrates specific structures of the electronic appliances. In FIG. 12, a display device 5000 is an example of an electronic appliance including a power storage device 5004 in accordance with one embodiment of the present invention. Specifically, the display device 5000 corresponds to a display device for TV broadcast reception and includes a housing 5001, a display portion 5002, speaker portions 5003, the power storage device 5004, and the like. The power storage device 5004 in accordance with one embodiment of the present invention is provided inside the housing 5001. The display device 5000 can receive power from a commercial power supply. Alternatively, the display device 5000 can use power stored in the power storage device 5004. Thus, the display device 5000 can be operated with the use of the power storage device 5004 in accordance with one embodiment of the present invention as an uninterruptible power supply even when power cannot be supplied from a commercial power supply due to power failure or the like.

A semiconductor display device such as a liquid crystal display device, a light-emitting device in which a light-emitting element such as an organic EL element is provided in each pixel, an electrophoresis display device, a digital micromirror device (DMD), a plasma display panel (PDP), a field emission display (FED), and the like can be used for the display portion 5002.

Note that the display device includes, in its category, all of information display devices for personal computers, advertisement displays, and the like other than TV broadcast reception.

In FIG. 12, an installation lighting device 5100 is an example of an electronic appliance including a power storage device 5103 in accordance with one embodiment of the present invention. Specifically, the lighting device 5100 includes a housing 5101, a light source 5102, the power storage device 5103, and the like. FIG. 12 shows the case where the power storage device 5103 is provided in a ceiling 5104 on which the housing 5101 and the light source 5102 are installed; alternatively, the power storage device 5103 may be provided in the housing 5101. The lighting device 5100 can receive power from a commercial power supply. Alternatively, the lighting device 5100 can use power stored in the power storage device 5103. Thus, the lighting device 5100 can be operated with the use of the power storage device 5103 in accordance with one embodiment of the present invention as an uninterruptible power supply even when power cannot be supplied from a commercial power supply because of power failure or the like.

Note that although the installation lighting device 5100 provided in the ceiling 5104 is shown in FIG. 12 as an example, the power storage device of one embodiment of the present invention can be used in an installation lighting device provided in, for example, a wall 5105, a floor 5106, a window 5107, or the like other than the ceiling 5104. Alternatively, the power storage device can be used in a tabletop lighting device and the like.

As the light source 5102, an artificial light source which provides light artificially by using power can be used. Specifically, an incandescent lamp or a discharge lamp such as a fluorescent lamp, and a light-emitting element such as an LED or an organic EL element are given as examples of the artificial light source.

In FIG. 12, an air conditioner including an indoor unit 5200 and an outdoor unit 5204 is an example of an electronic appliance including a power storage device 5203 in accordance with one embodiment of the present invention. Specifically, the indoor unit 5200 includes a housing 5201, a ventilation duct 5202, the power storage device 5203, and the like. Although FIG. 12 illustrates the case where the power storage device 5203 is provided in the indoor unit 5200, the power storage device 5203 may be provided in the outdoor unit 5204. Further alternatively, the power storage devices 5203 may be provided in both the indoor unit 5200 and the outdoor unit 5204. The air conditioner can receive power from a commercial power supply. Alternatively, the air conditioner can use power stored in the power storage device 5203. Specifically, in the case where the power storage devices 5203 are provided in both the indoor unit 5200 and the outdoor unit 5204, the air conditioner can be operated with the use of the power storage devices 5203 in accordance with one embodiment of the present invention as an uninterruptible power supply even when power cannot be supplied from a commercial power supply due to power failure or the like.

Note that although the separated air conditioner including the indoor unit and the outdoor unit is illustrated in FIG. 12 as an example, the power storage device of one embodiment of the present invention can be used in an air conditioner in which the functions of an indoor unit and an outdoor unit are integrated in one housing.

In FIG. 12, an electric refrigerator-freezer 5300 is an example of an electronic appliance including a power storage device 5304 in accordance with one embodiment of the present invention. Specifically, the electric refrigerator-freezer 5300 includes a housing 5301, a door for a refrigerator 5302, a door for a freezer 5303, the power storage device 5304, and the like. The power storage device 5304 is provided in the housing 5301 in FIG. 12. The electric refrigerator-freezer 5300 can receive power from a commercial power supply or can use power stored in the power storage device 5304. Thus, the electric refrigerator-freezer 5300 can be operated with the use of the power storage device 5304 in accordance with one embodiment of the present invention as an uninterruptible power supply even when power cannot be supplied from a commercial power supply because of power failure or the like.

Note that among the electronic appliances described above, a high-frequency heating apparatus such as a microwave and an electronic appliance such as an electric rice cooker require high power in a short time. The tripping of a circuit breaker of a commercial power supply in use of electronic appliances can be prevented by using the power storage device of one embodiment of the present invention as an auxiliary power supply for supplying power which cannot be supplied enough by a commercial power supply.

In addition, in a time period when electronic appliances are not used, specifically when the proportion of the amount of power which is actually used to the total amount of power which can be supplied by a commercial power supply (such a proportion is referred to as the usage rate of power) is low, power can be stored in the power storage device, whereby the usage rate of power can be reduced in a time period when the electronic appliances are used. In the case of the electric refrigerator-freezer 5300, power can be stored in the power storage device 5304 at night time when the temperature is low and the door for a refrigerator 5302 and the door for a freezer 5303 are not opened and closed. The power storage device 5304 is used as an auxiliary power supply in daytime when the temperature is high and the door for a refrigerator 5302 and the door for a freezer 5303 are opened and closed; thus, the usage rate of power in daytime can be reduced.

Next, a portable information terminal which is an example of electronic appliances will be described with reference to FIGS. 13A to 13C.

Figure 13A:
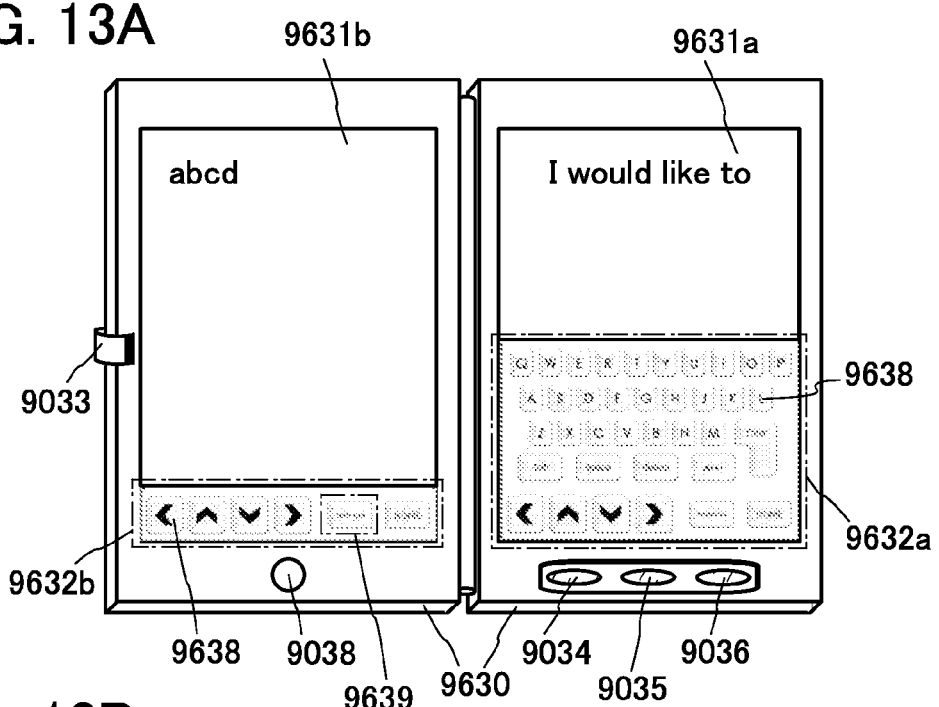
FIGS. 13A to 13C illustrate an example of an electronic appliance.
Figure 13B:
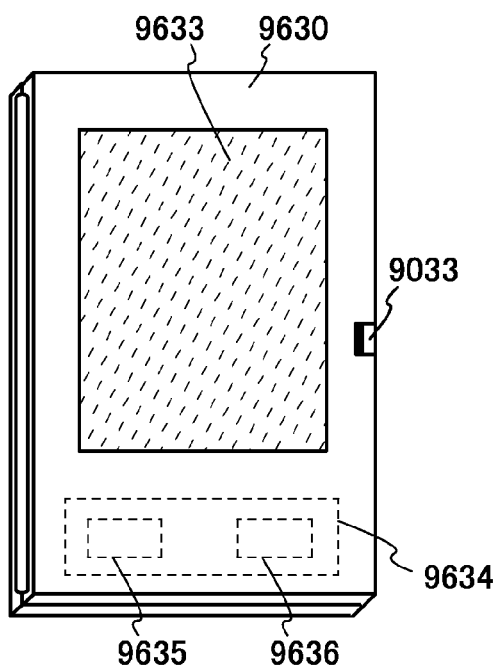

FIGS. 13A and 13B illustrate a tablet terminal that can be folded. In FIG. 13A, the tablet terminal is opened, and includes a housing 9630, a display portion 9631*a*, a display portion 9631*b*, a switch 9034 for switching display modes, a power switch 9035, a switch 9036 for switching to power-saving mode, a fastener 9033, and an operation switch 9038.

Part of the display portion 9631*a* can be a touch panel region 9632*a* and data can be input when a displayed operation key 9638 is touched. Although a structure in which a half region in the display portion 9631*a* has only a display function and the other half region has a touch panel function is shown as an example, the display portion 9631*a* is not limited to the structure. The whole region in the display portion 9631*a* may have a touch panel function. For example, the display portion 9631*a* can display keyboard buttons in the whole region to be a touch panel, and the display portion 9631*b* can be used as a display screen.

Similarly to the display portion 9631*a*, part of the display portion 9631*b* can be a touch panel region 9632*b*. A switching button 9639 for showing/hiding a keyboard of the touch panel is touched with a finger, a stylus, or the like, so that keyboard buttons can be displayed on the display portion 9631*b*.

Touch input can be performed in the touch panel region 9632*a* and the touch panel region 9632*b* at the same time.

The switch 9034 for switching display modes can switch the display between portrait mode, landscape mode, and the like, and between monochrome display and color display, for example. The switch 9036 for switching to power-saving mode can control display luminance to be optimal in accordance with the amount of external light in use of the tablet terminal which is detected by an optical sensor incorporated in the tablet terminal. Another detection device including a sensor for detecting inclination, such as a gyroscope or an acceleration sensor, may be incorporated in the tablet terminal, in addition to the optical sensor.

Note that FIG. 13A shows an example in which the display portion 9631*a* and the display portion 9631*b* have the same display area; however, without limitation thereon, one of the display portions may be different from the other display portion in size and display quality. For example, one display panel may be capable of higher-definition display than the other display panel.

The tablet terminal is closed in FIG. 13B. The tablet terminal includes the housing 9630, a solar cell 9633, a charge/discharge control circuit 9634, a battery 9635, and a DCDC converter 9636. In FIG. 13B, a structure including the battery 9635 and the DCDC converter 9636 is illustrated as an example of the charge/discharge control circuit 9634. The power storage device described in any of the above embodiments is used as the battery 9635.

Since the tablet terminal can be folded, the housing 9630 can be closed when the tablet terminal is not used. As a result, the display portion 9631*a* and the display portion 9631*b* can be protected; thus, a tablet terminal which has excellent durability and excellent reliability in terms of long-term use can be provided.

In addition, the tablet terminal illustrated in FIGS. 13A and 13B can have a function of displaying a variety of kinds of data (e.g., a still image, a moving image, and a text image), a function of displaying a calendar, a date, the time, or the like on the display portion, a touch-input function of operating or editing the data displayed on the display portion by touch input, a function of controlling processing by a variety of kinds of software (programs), and the like.

The solar cell 9633 provided on a surface of the tablet terminal can supply power to the touch panel, the display portion, a video signal processing portion, or the like. Note that a structure in which the solar cell 9633 is provided on one or two surfaces of the housing 9630 is preferable to charge the battery 9635 efficiently. When the power storage device described in any of the above embodiments is used as the battery 9635, there is an advantage of downsizing or the like.

The structure and the operation of the charge/discharge control circuit 9634 illustrated in FIG. 13B are described with reference to a block diagram in FIG. 13C. The solar cell 9633, the battery 9635, the DCDC converter 9636, a converter 9637, switches SW1 to SW3, and the display portion 9631 are shown in FIG. 13C, and the battery 9635, the DCDC converter 9636, the converter 9637, and the switches SW1 to SW3 correspond to the charge/discharge control circuit 9634 in FIG. 13B.

First, an example of the operation in the case where power is generated by the solar cell 9633 using external light is described. The voltage of power generated by the solar cell is raised or lowered by the DCDC converter 9636 so that the power has a voltage for charging the battery 9635. Then, when the power from the solar cell 9633 is used for the operation of the display portion 9631, the switch SW1 is turned on and the voltage of the power is raised or lowered by the converter 9637 so as to be a voltage needed for the display portion 9631. In addition, when display on the display portion 9631 is not performed, the switch SW1 is turned off and the switch SW2 is turned on so that charge of the battery 9635 may be performed.

Note that the solar cell 9633 is described as an example of a power generation means; however, without limitation thereon, the battery 9635 may be charged using another power generation means such as a piezoelectric element or a thermoelectric conversion element (Peltier element). For example, the battery 9635 may be charged with a non-contact power transmission module which is capable of charging by transmitting and receiving power by wireless (without contact), or another charging means may be used in combination.

Figure 13C:
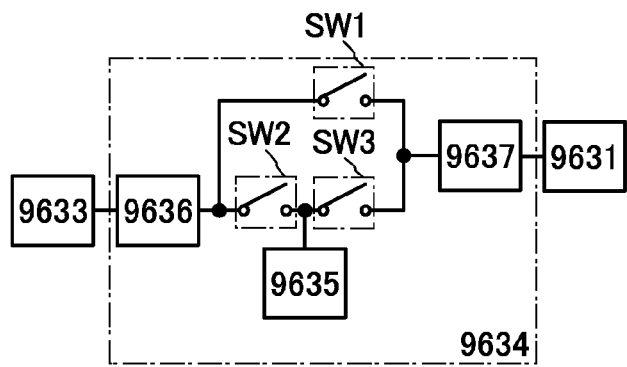

It is needless to say that one embodiment of the present invention is not limited to the electronic appliance illustrated in FIGS. 13A to 13C as long as the power storage device described in any of the above embodiments is included.

This embodiment can be combined with any of the other embodiments as appropriate.

This application is based on Japanese Patent Application serial no. 2011-217911 filed with the Japan Patent Office on Sep. 30, 2011, the entire contents of which are hereby incorporated by reference.

What is claimed is:

1. A power storage device comprising a negative electrode comprising:
   a current collector;
   an active material layer over and in contact with an entire top surface of the current collector; and
   a protective layer over and in contact with a vertex of the active material layer,
   wherein an etching rate of the protective layer is lower than that of the active material layer,
   wherein a plurality of cavities is formed in the active material layer and the protective layer, and
   wherein the active material layer has a width greater than or equal to 0.1 µm and less than or equal to 1 µm.

2. The power storage device according to claim 1, wherein the plurality of cavities is arranged at regular intervals.

3. The power storage device according to claim 1, wherein the plurality of cavities is arranged in a matrix.

4. The power storage device according to claim 1, wherein the active material layer has a honeycomb structure.

5. The power storage device according to claim 1, wherein the active material layer has a truss structure.

6. A power storage device comprising a negative electrode comprising:
   a current collector;
   an active material layer over and in contact with an entire top surface of the current collector; and
   a protective layer over and in contact with a vertex of the active material layer,
   wherein an etching rate of the protective layer is lower than that of the active material layer,
   wherein a plurality of cavities is formed in the active material layer and the protective layer, and
   wherein the active material layer has a width greater than or equal to 0.1 µm and less than or equal to 1 µm, and has a height greater than or equal to 0.5 µm and less than or equal to 100 µm.

7. The power storage device according to claim 6, wherein the plurality of cavities is arranged at regular intervals.

8. The power storage device according to claim 6, wherein the plurality of cavities is arranged in a matrix.

9. The power storage device according to claim 6, wherein each of the plurality of cavities has a hexagonal structure.

10. The power storage device according to claim 6, wherein each of the plurality of cavities has a triangular structure.

* * * * *